United States Patent
Molyneux et al.

(10) Patent No.: US 9,613,321 B2
(45) Date of Patent: Apr. 4, 2017

(54) SYSTEM AND METHOD FOR ESTABLISHING A DYNAMIC META-KNOWLEDGE NETWORK

(71) Applicants: Sam David Molyneux, Toronto (CA); Amy Catherine Molyneux, Toronto (CA)

(72) Inventors: Sam David Molyneux, Toronto (CA); Amy Catherine Molyneux, Toronto (CA)

( * ) Notice: Subject to any disclaimer, the term of this patent is extended or adjusted under 35 U.S.C. 154(b) by 424 days.

(21) Appl. No.: 13/623,933

(22) Filed: Sep. 21, 2012

(65) Prior Publication Data

US 2013/0080266 A1    Mar. 28, 2013

Related U.S. Application Data

(60) Provisional application No. 61/538,450, filed on Sep. 23, 2011.

(51) Int. Cl.
G06F 17/00    (2006.01)
G06Q 10/00    (2012.01)

(52) U.S. Cl.
CPC .................................. G06Q 10/00 (2013.01)

(58) Field of Classification Search
CPC .... G06F 17/2247; G06F 17/24; G06F 17/211; G06F 17/30; G06F 17/30864; G06Q 50/01
USPC ........................................ 715/234; 705/14.72
See application file for complete search history.

(56) References Cited

U.S. PATENT DOCUMENTS

| | | | |
|---|---|---|---|
| 7,130,848 B2 * | 10/2006 | Oosta | |
| 8,024,328 B2 * | 9/2011 | Dolin et al. | 707/723 |
| 8,117,281 B2 * | 2/2012 | Robinson et al. | 709/218 |
| 8,316,001 B1 * | 11/2012 | Albrecht et al. | 707/706 |
| 8,386,487 B1 * | 2/2013 | Ben-Artzi | G06F 17/30705 707/737 |
| 2003/0061209 A1 * | 3/2003 | Raboczi et al. | 707/3 |
| 2004/0215657 A1 * | 10/2004 | Drucker | G06F 17/3002 |
| 2005/0027712 A1 * | 2/2005 | Gargi | G06F 17/30274 |
| 2006/0116994 A1 * | 6/2006 | Jonker | G06F 17/30017 |
| 2006/0248076 A1 * | 11/2006 | Troy et al. | 707/5 |
| 2012/0078719 A1 * | 3/2012 | Bhagwan | G06F 17/30882 705/14.54 |

(Continued)

*Primary Examiner* — Scott Baderman
*Assistant Examiner* — Jason Edwards

(57) ABSTRACT

The present disclosure relates to a system and method for establishing a dynamic meta-knowledge network. More particularly, it relates to a computer implemented system and method for charting, mapping, linking, annotating, evaluating, following, broadcasting and publishing scientific, technical, medical and scholarly information, both current and historical. In an embodiment, the present system and method may be embodied in an internet application composed of a database containing scientific publication records, scientific meta-knowledge data, and user profiles. Scientific meta-knowledge stored in the database includes knowledge contexts as well as descriptive and quantitative annotations. Author names and entities within each knowledge context category and annotation category are linked to the appropriate publications. A publication webpage is generated for each publication record, and this is configured to aggregate and present stored data and links that are relevant (and specific) to each publication.

20 Claims, 16 Drawing Sheets

(56) References Cited

U.S. PATENT DOCUMENTS

2012/0102062 A1\* 4/2012 Gurnani et al. .............. 707/769

\* cited by examiner

SYSTEM AND METHOD FOR ESTABLISHING A DYNAMIC META-KNOWLEDGE NETWORK

CROSS-REFERENCE TO RELATED APPLICATION

This application claims benefit of, and incorporates in its entirety by reference U.S. Provisional Patent Application No. 61/538,450 titled "System and Method for Establishing a Dynamic Meta-Knowledge Network," filed on Sep. 23, 2011.

FIELD OF THE INVENTION

The present invention relates generally to a system and method for managing a dynamic meta-knowledge network. More particularly, it relates to systems and methods for managing documents and materials associated with meta-data and quantitative data in a database.

BACKGROUND

To those involved in the scientific enterprise, whether in its mechanisms, support or the application of its products, the ability to navigate both past and current published literature is essential. To accomplish this, effective methods are required to locate, organize, link and summarize scientific ideas and findings as they emerge, within the context of those that constitute their basis. Currently, greater than 1 million scientific papers are published each year in more than 25 thousand journals. This amounts to a total of greater than 20 million publications in biomedical sciences alone, which increases by 2 to 4 thousand new documents per day. Furthermore, the landscape of scientific research continues to increase in complexity due to a trend towards progressive discipline specialization. At such a scale it has become a major challenge for researchers to stay up to date in their own fields, let alone all of science. Research information overload threatens the ability of scientists and their related community to efficiently construct knowledge and to research in a collective manner.

Scientific, medical and technical journals have, in the past, enabled the navigation of scientific literature by organizing according to topic and quality on a system-wide scale. Besides a small number of multi-disciplinary journals which publish papers of broad interest, the vast majority of are highly specialized in their content, and restrict themselves to a particular field. New journals develop in response to discoveries which branch fields into ever more specialized areas. Journals can be ranked according to a variety of metrics; a prime example of these is the Journal Impact Factor, which is calculated on the average number of citations received per paper published in a given journal during the two preceding years. Individual articles thus tend to be judged, by proxy, according on the status of their journal of publication. Scientific journals have played a pivotal role in the development of modern science by additionally providing a mechanism for workers to i) disseminate new results and ideas ii) register a date of priority for new discoveries and iii) validate and improve the quality of impending publications by way of peer review. Indeed, dissemination and registration of scientific results originally motivated the development of journals. Over the past century a dramatic expansion in journal number, commensurate with increasing numbers of scientists and papers published each year, and combined with a virtually universal transition from paper to electronic publishing, shifted the consumption of journal articles from a subscription- to search-driven activity. In biomedicine, for example, the National Center for Biotechnology Information PubMed abstract database mixes journal content across topic and impact level, allowing search nets to be cast broadly. As such, the ability to find relevant publications within any field of study has become dependent on the skilled operation and capacity of tools for filtering large literature databases.

In terms of finding important and relevant information, the World Wide Web presents an apparently similar problem, scaled up by greater than two orders of magnitude. Here, filtering a network of billions of linked documents has been handled via the development of powerful internet-wide search engines. Querying results not only in the instant retrieval of hyperlinks to all indexed documents harboring the query terms, but a ranked list, organized by relevance. The calculation of relevance is accomplished using algorithms able to estimate the relative importance of the retrieved documents based on the structural features of the hyperlink network, as exemplified by the PageRank algorithm, as well as other factors. When applied to scientific literature databases, search engines are effective for certain goals; for example, using a search engine it is trivial to locate every article that contains the word protein, or the most recently published set. Experienced users can construct advanced filters using Boolean operators, however the success of the search is contingent on the terms, synonyms and syntax that are used. Thus, searching for documents in this manner may result in a hit or miss, depending on the skill of the searcher.

What is needed is an improved system and method that addresses some of these significant challenges and limitations in the prior art. As will be described in more detail, the problem of finding relevant scientific information differs from a typical internet query in several aspects, one of which is the temporal dependence of later produced works on those that precede them. Published scientific ideas and findings tend to be cumulative, and theoretically can be arranged into continuous lines of inquiry, which begin at a primordial expression of the concept or theory and branch as new insights expand the territory that is open for investigation. Therefore, context is necessary to evaluate the merits of an article toward the collective pursuit of its stated objectives. It is often desired, for example, to trace publications along the development of a particular line of research. This is especially the case when one seeks to obtain a broad perspective on work in a particular topic, summarize the context of a new idea or finding, identify open research problems, or to map important discoveries in a field and understand their intellectual roots. Search engines are innately unsuited to such analyses, since a ranked list of relevant material is not what is sought, but rather an ordered historical narrative. Although it is feasible to construct a single search engine query that will return the majority of publications contributing to a particular topic of research, this is challenging without prior knowledge of which specific documents must be found. Moreover, the complexity of such a query precludes this as a routine approach, leading instead to a strategy comprising iterative search and query refinement cycles. Considering the diverse works contributing to the progress of a field, and the number of technical synonyms used to describe their results, approaches such as this not only are tedious and time consuming, but unlikely to be exhaustive. The issue is made worse by the fact that, for an individual to stay current on any topic, searches must be repeated as often as possible. Published review-style articles serve as the classic resource for overviews of any topic or subfield; as such they are a natural starting point to identify important citations and appreciate their context. However, it can require months of research for review authors to compile an authoritative list of citations from which an article's discussions and concepts will be synthesized. Further, review articles tend to rapidly age with the progression of a field, often becoming partially out of date by their time of publication.

Scientific publications communicate significant information beyond the topical, or explicit, knowledge contained within each work. These latent signals, termed meta-knowledge ("knowledge about knowledge"), include information used to situate an article within its many relevant settings, and rely on the depth of a reader's understanding of related work, as well as social contexts and norms in scientific research. Scholarly articles each reference dozens of publications from a variety of fields that they build upon in some aspect, however their primary advances are usually only pertinent to one or two areas of research. Experienced workers in these areas are able to quickly appreciate the relevance of a study and appraise its impact based on a constellation of indicators, both general and specific. These include the publication history and reputation of the authors, author teams and collaborative networks of teams.

Likewise, the research focus and prestige of an article's institute of origin, and even the institute's geographical location, can flag it as potentially important. In the context of an article's intended field, the date of publication locates it within the framework of understanding current to that time period, the assumptions of the authors being similar to those of their contemporaries, and the meaning of the results deciphered in light of what was known. The methods and materials used in a study signal informed readers to classify it with past works that offered similar types of evidence in support their rational and interpretations. While the identity of an article's publishing journal can suggest its impact, much more specific measures are available.

The simplest and best known of these is the number of citations a publication has received over its lifetime. Where citations are slow to accrue, newer, more immediate metrics have been proposed that exploit digital footprints of knowledge consumption on the internet; these include measurements of article readership (e.g. article HTML pageviews) and references in social media (e.g. the number of Twitter posts pointing to a particular publication). Similarly, the connected nature of the internet allows the consolidation of traditional, but decentralized, indicators of publication impact and author status, including awards and grants stemming from particular works.

While the true merit of a publication can only be ascertained by studying the explicit knowledge it contains, scientific meta-knowledge can provide vital cues about which documents are relevant and important, in the face of the tremendous body of literature that now exists. Given the widespread adoption of social applications on the internet, ranging from wiki-style encyclopaedias and answer engines to specialized social networks, it is now possible to envision powerful socially-driven alternatives to scientific literature search engines. In particular, it should be feasible to invert the workflow of published knowledge discovery from an activity characterized by repetitive search and context reconstruction to one of context- and data-driven browsing and article selection.

SUMMARY

The present disclosure relates generally to a system and method for establishing a dynamic meta-knowledge network. More particularly, it relates to a computer implemented system and method for charting, mapping, linking, annotating, evaluating, following, broadcasting and publishing scientific, technical, medical and scholarly information, both current and historical.

In an embodiment, the present system and method may be embodied in an internet application composed of a database containing scientific publication records, scientific meta-knowledge data, and user profiles. Scientific meta-knowledge stored in the database includes knowledge contexts as well as descriptive and quantitative annotations. Author names and entities within each knowledge context category and annotation category are linked to the appropriate publications. A publication webpage is generated for each publication record, and this is configured to aggregate and present stored data and links that are relevant (and specific) to each publication. WebPages are generated for entities within knowledge contexts and special annotation categories, which aggregate the publications that they are linked to. Each aggregator webpage is configured with graphical interfaces to display appropriate quantitative annotation data for the publications it aggregates. These interfaces include timelines, geographical maps, and timelines that integrate with geographical maps.

Users are able to link their profiles to citation author names, thereby linking publication pages to their profiles. Users are permitted to annotate the publications, knowledge context and special annotation aggregator pages by linking publications to additional contexts and annotations, uploading files, writing wiki-style articles, and by participating in discussion forums.

In a further embodiment, users can broadcast and share publications with each other via groups formed according to real-life patterns of research collaboration. Groups of users are able to post blog articles for each other to read. Users are able stream new publications and user activity into a customized news-feed by selecting pages, authors and knowledge contexts to follow. Emailed reports are generated on a regular basis to summarize new publications and activity from feeds a user has subscribed to.

Aspects of an embodiment include creating a web implemented computer network providing access to a plurality of web pages for a large number of knowledge contexts, and that fall into several main categories (e.g. Fields, Topics, Authors, and Institutes etc). This contrasts strongly with current social networks for Scientists, which typically are centered on individual User profiles, and may include the ability for users to form Groups (these are often based on common interests, rather than real-life research teams who publish together).

Another aspect of an embodiment includes the aggregation of publications to their accurate knowledge contexts. This is required to allow quantitative and qualitative data on publication consumption and reuse to be intrinsically normalized within each context. The importance or value of a publication based on these data can only be ascertained in comparison to its correct publication-peers, and this set changes relative to each context.

Another aspect of an embodiment includes the representation of publications for each knowledge context as datapoints within graphical interfaces. In comparison to a typical citation-list, this allows thousands of publications to be rapidly scanned to identify documents of interest. The graphical interfaces must be tailored to the context type, and depend on the dominant questions that a user would seek to answer relative to the context. For example, the use of timelines within an Institute page, quantitative "stock market" type timelines within a Field page, or pie-chart breakdowns of Field contributions for a Location page.

The above outlined aspect of the design and functionality of a meta-knowledge network in accordance with the present invention, directly address key challenges for the user. These challenges were not addressed previously, and in accordance with the invention, as described, provide an innovation platform solution that addresses these challenges in a way that is scalable, engaging, effective, and easy to use.

In an embodiment, each publication is assigned a "primary" affiliation, which is normally determined by the affiliation of the first and last authors of the paper. When additional authors of a paper (with affiliations that are different from the primary affiliation) register an account on the system, each publication will also become associated with their account and map location. Through this mechanism, networks of collaboration can be charted and visualized. Furthermore, all publications associated with a particular field can be visualized via mapping and timeline-linked mapping, allowing the landscape of contributions and contributors to be analyzed graphically.

The present system and method may be understood as a content distribution network that promotes the distribution of content in particular that meets qualitative criteria established collaboratively by a computer network enabled social network. In effect the content distribution network promotes the dissemination of content on its merits, rather than other criteria less relevant to the quality of the content. By enabling the "best" content to be made available to the individuals interested in this content, quickly and efficiently, the platform can promote significant improvements in a range of activities that depend on access to quality content, including research, product development, software development and so on.

The system meta-knowledge network technology described herein can be configured to further encompass the formal and physical sciences, as well as the social sciences. In general, with minor modifications to what is outlined here, meta-knowledge networks are likely to also be useful for navigating information in other areas of knowledge, such as the news and consumer technologies.

DETAILED DESCRIPTION

The present disclosure relates generally to a system and method for establishing a dynamic meta-knowledge network. More generally, the present system embodies a novel large-scale web-based framework for the navigation and management of published scientific information, leveraging features from modern online social applications combined with explicit scientific knowledge linked to extensive contextual and annotative scientific meta-knowledge.

By way of illustration, the present disclosure describes various functions and capabilities of the present system and method as applied to the life sciences. More specifically, the system and method of the embodiment uses the complete biomedical literature abstract set, obtained from the National Center for Biotechnology Information PubMed database, and publicly available citation data derived from articles in the PubMed Central repository. In various other embodiments the system and method may be applied to other types of publication, documentation or literature. A citation is the minimal information required to unambiguously identify a single published document (e.g. title, authors, publishing entity, date, volume and pagination; digital object identifier (DOI) in some cases is sufficient).

Figure 1:
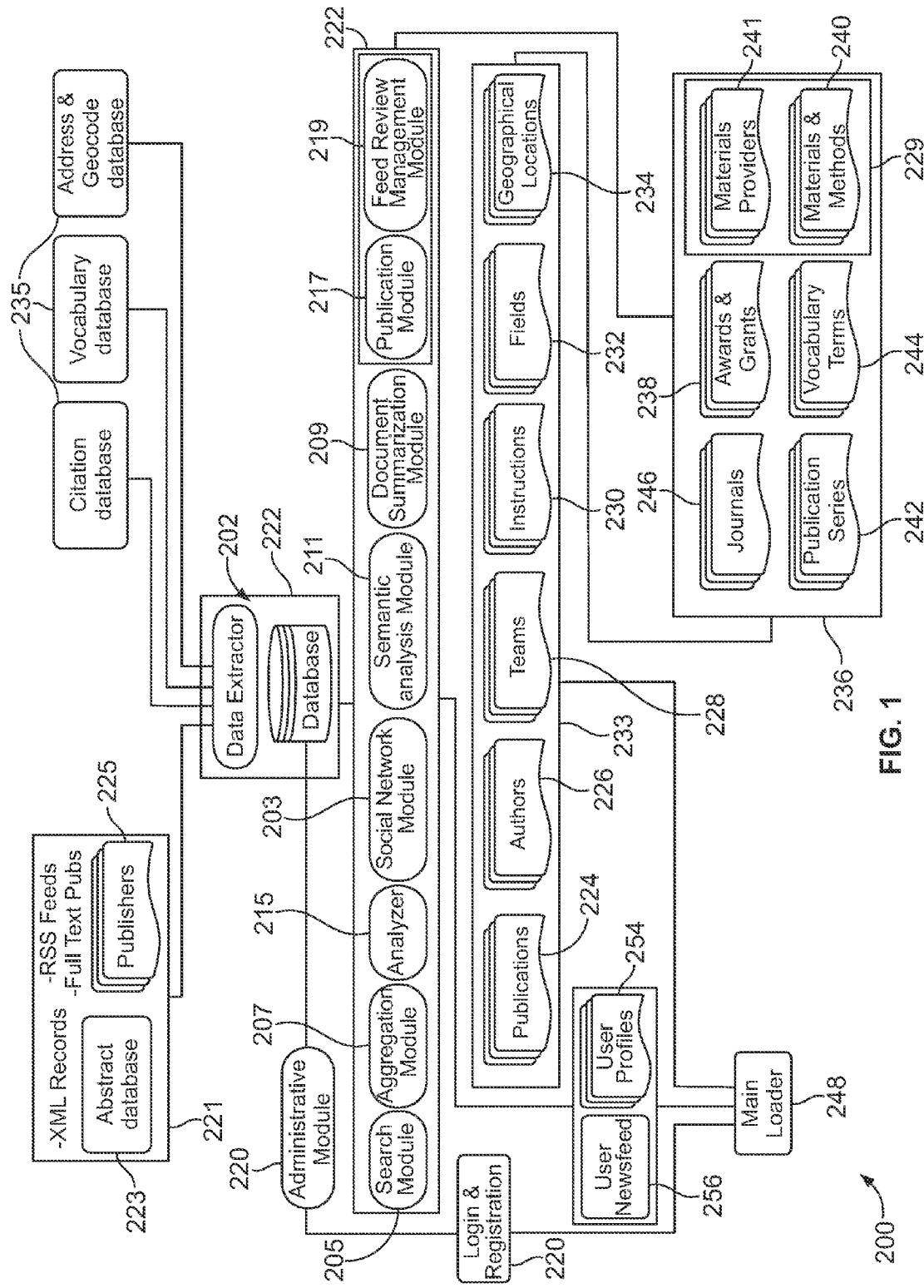
FIG. 1 shows a schematic block diagram of a system according to an embodiment of the invention.

Now referring to FIG. 1, therein is shown schematic block diagrams of an illustrative system 200 in accordance with an embodiment. The various components of the system 200 are now described in more detail. These components interact with one another to perform the functions of the system and method of the invention. The system 200 includes Core System Modules 222 that includes Extractor/Database Management Module 202. Extractor/Database Management Module 202 parses and assigns publication record data to appropriate database fields (citation author IDs, journal name, title, abstract, date published, affiliation, imports institute names in predefined lists). A similar procedure is used for institute divisions, networks etc. Extractor/Database Management Module 202 also matches unique affiliation strings to institute names and links cited publications to those that cite them according to citation ID pairs obtained from the citation database (cited document/citing-side document PubMed IDs). The citation author ID is the traditional name used to identify authors on academic publications (usually in the format: Molyneux SD). More common names such as "Smith D" cannot unambiguously identify unique authors in publication databases. A system author ID is a unique numeric ID used to unambiguously identify system users who have associated their profile with a citation author ID. A cited publication is any publication that has been referenced by a later published document. A citing side publication is any published document harboring a reference to another published or expected to be published work.

Also Extractor/Database Management Module 202 parses and creates a flat or hierarchical vocabulary taxonomy using vocabulary data, and terms that are linked to publication records possessing matching terms in their metadata fields and links Address/geocode data to matching institute names and to geographical locations (locations imported from a predefined list [country, state/province/city]). Additionally Extractor/Database Management Module 202 creates pages for knowledge contexts, including citation author IDs, publications, institutes, geographical locations, creates pages for special annotation categories, such as journals and vocabulary terms, and links knowledge context and special annotation pages to publication pages based on data contained in publication records. A publication page is linked to its appropriate journal page. System 200 is used to provide services to system users. A system user is any person who has signed up for a system account. System users can be further divided into Authors and Community members, depending on whether a citation author ID has been assigned to their profile. An anonymous system user is any user who has not signed up for a system account System 200 also includes Social Network Module 203 which creates knowledge context pages for fields and teams based on user actions, creates special annotation pages for publication series, awards, grants, materials & methods, and for materials providers based on user actions, and allows users to update, alter, annotate and link knowledge context pages that were automatically created by the data extractor/database management module 202. Users can also create new institute knowledge context pages (adding to the automatically created set). Module 203 implements functions that allow users to link publication pages to knowledge context and special annotation pages (e.g. link a publication page to a material & method page), to link knowledge context pages and special annotation pages to each other (e.g. link a material & method page to a material provider page), and to nominate publications to fields, thus linking a publication to a field, and to specify the level of contribution that the publication encompasses (basic, major, seminal and landmark). Other users are allowed to vote up or down on the type of contribution nomination.

Social Network Module 203 implements the functions that provide democratic forums for knowledge context and special annotation pages, with vote up/down mechanisms, provides messaging features that allow users to follow new publications and user actions within knowledge context pages and special annotation pages, which are streamed to the user newsfeed and email reports, provides functions that allow users to form groups (teams) and creates pages for those teams (based on their real-life research groups) that users can link to institute pages and to their profiles.

Additional functions provided by Social Network Module 203 include functions that allows users to broadcast and share knowledge context and special annotation pages, as well as user actions (e.g. a posted question or comment) with user teams and groups of teams (e.g. broadcast a new publication to you lab team members, or to all labs associated with a particular institute), functions that allows users to share the system content with external social network application (3rd party), including Facebook™, Twitter™ and using RSS feeds. Social Network Module 203 also records and presents publication abstract viewing history, allowing users to find previously viewed publications, flags user actions on the site and assigns acting user rewards based on the nature of the action (adding a biography for a citation author id, creation or addition of field/institute context), allows users to create a discussion topic based on any number of publications and comment on same (will also using voting up and down mechanisms), and allows users to add publication references to existing discussion topic so that discussion topics are then tied to the publications that they reference.

The creation of a social-functionality enabled network of WebPages representing the publishing entities, topics and tools of research found in the real-world, allows data and documents associated with each to be pre-populated. Thus, instead of spending large volumes of time searching for documents associated with a particular query, users can simply search for the entity or object of the query itself. In other words, the present invention also provides a novel search methodology and search experience. Graphical interfaces implemented on the knowledge context pages permit individual documents to be presented as data, allowing very large numbers of documents to be visually scanned. Integrating diverse associated data (e.g. citation counts and geolocations) allows documents to be rapidly identified based on particular attributes relative to other documents within any given context. Restricting user-context associations and social networking functions to patterns aligns and enforces the norms and standards of identification and behaviour to that those found outside the web.

Users of the present technology are able to see instant summaries of a publication's status without having to navigate to each context it's associated with, and similarly, users of the platform of the present invention are able to access information from each context they follow brought to a central interface in a constant stream, rather than needing to repeatedly navigate to their contexts of interest. The system as a whole is operable to harness the data generated by its user activity, in addition to outside data that is imported, to further highlight and bring attention to important publications. Furthermore, the system may be configured to include one or more features to take into account inactive and abandoned knowledge contexts, and should, in some aspects incorporate structured vocabularies and taxonomies to guide the growth and structural development of the site.

The reviewers and their interactions with their various research social networks can drive spikes of interest in particular content based on their quality, which enables content to gain visibility dynamically, based on relevance of the content to the associated criteria, and also and more importantly system assigned qualitative criteria that enable additional searching or filtering of research content, for example by identifying additional relevant work from a contributor, now working at another institution, that might otherwise not have been identified using prior art search methods. In other words, the platform of the present invention enables the most relevant ideas or research to automatically "rise to the top" in terms of the profile associated with the content, and the attention it receives in the platform from other users. This enables ideas and research to attract attention quickly, and on its merit, rather than other irrelevant criteria. This results in improved dissemination of information, and to the particular individuals who can digest and adapt the ideas, information or research best. This will result for example in better research outcomes, achieved more rapidly, and also enabling researchers to avoid "reinventing the wheel". The platform of the present invention will also reduce the time required for researchers to find similar work that has been done by other individuals or teams whether to focus the research in an area that has not been explored, to help validate research, find collaborators and so on. The innovation of the present invention in effect can accelerate the speed of innovation amongst all participating users.

The present system and method enables the mining of the real source of quality research content, and then by providing tools for mapping this source to other locations and collaborators, enables efficient generation of research "landscapes" in specific domains, by leveraging the meta-knowledge network provided. Discuss specifically "mapping" aspect where the system identifies contributor relationships that tie work in different locations in the same or similar defined area of research. These relationships can be linked to an actual geographic map representation. The use of social networking for functions as "Following", sharing, broadcasting, and commenting (via democratic question and Analysis forums) is implemented in a manner aligned with real-world behaviours, standards and needs. For example, users can Follow and Comment on any publication, however they can only broadcast publications to their associated institutes or labs. Publication pages provide a central summarization point of a publication's status across many of its associated contexts. Subscribed content is aggregated to user tailored newsfeeds and emailed reports.

Activity data derived from the built in social networking functions feeds back into the graphical interfaces provided, allowing the site itself to evolve and capture additional information about publication importance and value.

The web implemented network provided by the present invention allows for the existence of, and provide mechanisms for, interaction with historical knowledge contexts which are no longer active, but have played a role in the past. For example, the Authors of publications dated before 1940-50 will tend to be retired or deceased, but may have made substantial contributions to modern science. Therefore, for these authors bios and information pages written by users may be provided, and publication aggregator pages may be provided, which can be enriched and annotated. Similarly, defunct institutes and other inactive knowledge context pages are still valued and addressed by the platform o of the present invention. Some knowledge contexts are defined on or associated with a curated structured vocabulary, by operation of the present invention.

System 200 also includes Search Module 205. Search Module 205 implements the functions that allows all knowledge context, special annotation and user profile pages, and content within those pages, to be searched, provides faceted filters to narrow results from a particular query, allows search queries to be saved, with new results being added to user newsfeeds and, provides search suggestions using an "auto complete" feature Aggregator Module 207 implements the functions of identifying linked user actions (comments, blog posts etc), publication pages, knowledge context pages and special annotation pages and aggregating and consolidating linked pages and actions onto the pages they are linked to.

Document Summarization Module 209 of system 200 parses content and text within a publication page or publication document (e.g. PDF) and condenses content to produce a shortened version of the text.

Semantic Analysis Module 211 identifies knowledge context pages, special annotation pages, and, users and publications related to a particular context using a phrase or, word and phrase, based on similarity analysis.

Analyzer Module 215 provides functions that process numerical data mathematically to undertake normalizations, transformations and statistical calculations for individual publications, groups of publications, user activity within knowledge contexts and special annotation pages as well as globally across the site. Analyzer Module 215 also produces graphical displays of quantitative data including timelines, timelines integrated with geographical maps, line graphs, bar charts, scatter plots, heat maps, pie charts, histograms, bubble charts, surface graphs, area plots, radar charts, network graphs and others.

Publication Module 217 provides a "wizard" interface to assist with the construction of a new manuscript, provides structured text input fields for each written section of the manuscript (title, authors, abstract, introduction, results, discussion, materials & methods, conflict of interest, acknowledgements, references, supplementary data, figure legends [and subsections within each of those main sections]), provides file upload tools for figures and provides tools for image formatting and annotation (insertion of reference numbers to images). Publication Module 217 also provides tools for automatically linking and maintaining image references into the written text, tools to select authors from those within the system database (citation author IDs, and the system author ID), tools to select references from publication records within the system database and to insert those references into the written text sections, and into the reference section following written sections of the publication, and tools to add new manuscripts created using the wizard to the system database. Additionally Publication Module 217 provides options to share new manuscripts with listed authors for their approval, and to allow other authors editing permissions, provides upload tools to add PDF and other file format manuscripts (constructed off line and using other document creation tools) to the system database and, links newly created manuscripts with the peer review module 219.

System 200 includes Peer Review Module 219 implementing the functions of generating suggestions of peer reviewers for new manuscripts by linking to semantic analysis module 211, allowing author nomination of peer reviewers (from within the system user database, and via email invitations to individuals who are not registered users), allowing author blocking of potential peer reviewers and author to nominating of "handling" individuals, who will oversee selection of peer reviewers and the peer review process. Per review module 219 additionally provides functions that allow authors and peer reviewers to select peer review "style" options, including "3-peer anonymous" style traditional processes, as well as "full identity disclosure, manuscript public" options and others, that mediate secure transfer of new manuscripts from publication module to peer reviewers and handlers, that send alerts, deadline reminders, activity notifications to authors, reviewers and handlers through their logged-in homepages and via email and mediate transfer of comments and results from peer reviewers to authors. Peer review module 219 has the further function of providing options for authors to contest and respond to first round reviewer results, add additional rounds of review, and update manuscripts with new data and textual alterations, and add reviewed manuscripts to the system database as new publications by linking to the data extractor/database management module Administrative functions of system 200 are provided by administrative module 220. Administrative module 219 creates new user profiles via user input from a registration page, provides human verification measures (e.g. Capcha images) to block the creation of user profiles by bots, sends confirmation email to new user accounts to verify email addresses and verifies passwords and login information at the time of login. Administrative module 219 also controls "followed" entities and user actions from across the site (which will be added into user newsfeeds and email reports), allows users to control profile privacy, allows users to control the "theme" or skin of the site that is loaded at the time of login, and allows users to monitor other users site activity (comments, tags etc) and mark inappropriate behavior, automated un-publish behavior on these actions. In this respect, before explaining at least one embodiment of the system and method of the present disclosure in detail, it is to be understood that the present system and method is not limited in its application to the details of construction and to the arrangements of the components set forth in the following description or illustrated in the drawings. The present system and method is capable of other embodiments and of being practiced and carried out in various ways. Also, it is to be understood that the phraseology and terminology employed herein are for the purpose of description and should not be regarded as limiting.

The present system and method allows the semi-automated mapping of published scientific ideas and findings across the teams, fields and places where they have been produced throughout history, which is augmented by the actions of users.

The present system and method facilitates following, broadcasting and collective evaluation of new knowledge claims. Using graphical interfaces capable of harnessing diverse measures of publication popularity and quality, important and relevant publications can be identified via temporal and geographical exploration within the setting of individual fields and subfields, greatly minimizing search time. New publications and user actions within relevant knowledge contexts across the site are streamed to a consolidated newsfeed interface customized to each user, and in a single daily or weekly emailed report, allowing users to stay perpetually up-to-date on the most critical information affecting their work. Finally, the present system and method enables the collaborative annotation of published works, providing an extensible system to record the rich human context of scientific discovery.

The present system and method enables a new way to search for content, including research papers and other publications, and in effect "follow" content based on criteria other than for example key words appearing in an abstract, or search terms, or other traditional search mechanisms. For example, the key words may relate to the names of key researchers known in a defined area (usually a principal investigator who has been at a particular research institution for some time). Familiarity with a body of research is often tied to publications in "key" scientific publications for defined areas. The problem is that many scientific publications favor submissions from particular research institutions, whereas in fact very important research in defined areas may be happening in somewhat unexpected places, for example ones where a talented team has been assembled, where research in a defined area has received additional funding. For an emergent body of work in a defined area, tied to a research institution that is not yet recognized in this domain, to gain reputation in a defined area can take some time. The pace of research moves quickly, and there is a need and desire for accessing the "best" body of research, even though the team or institution may not yet have achieved widespread reputation, or the team or institution does not meet the sometimes subjective qualitative criteria applied by the research publication reviewers.

This can be accomplished with the novel and innovative platform of the present invention that provides a set of tools that increase the likelihood of a body of research being noticed on its merits, based on a series of tools that enable a research focused social network that includes new mechanisms for searching for content that are consistent with how an important body of research is developed, and social networking mechanisms such as "research social networks" that are formed dynamically around interest in and expertise in specific areas where research content is reviewed and content accumulates a quality score based on reviews by individuals whose interest/expertise profile matches to the research content, and the trust in this domain earned by the reviewer in the particular domain through his/her research social network.

The present invention provides significant innovation over the state of the art in a number of respects. First, the present invention differs from standard methods for literature navigation and organization. These include search-based querying of large literature databases, semantic analysis algorithms to suggest related documents, reference managers and citation network analysis (where publications are represented by nodes and citation-links represented by edges). The present invention additionally differs substantially from the canonical social network, which is exemplified by a web of user profiles connected according to "friendship" or whether users choose "Follow" each other's activity within the network. In comparison, the present invention provides a platform and methods to establish a network of knowledge contexts which are connected to each other by their related publications. Users may themselves constitute knowledge contexts (i.e. a user who is an author) or may associate themselves with knowledge contexts (i.e. users associated with a Team, or Institute), however the network is not designed specifically to connect users directly to each other (the special case of a user subscribing to "Follow" an Author (who is also user) is one of the only examples of the invention overlapping with a typical social network in its design).

An embodiment of system 200 providing a web application for users to access the system utilizes database 221 related to publications, including meta-data and quantitative data. This includes and is also derived from publication records (abstracts) from, for example, scientific abstract database 223 (e.g. PubMed for the biosciences) and publishers database 225, and is used to obtain essential publication identifiers and metadata—title, authors, relevant dates, affiliations, and abstracts etc.

Citation data Referencing links between published documents is derived from sources 235. The number of citing side document that reference a particular publication is an indicator of that publication's popularity. For example, PubMed Central is an open access source for this data in the biosciences. Required information includes accession IDs/DOIs or citations for the citing side publications, as well as the same information for the cited publications.

Academic institute names data can be obtained via an analysis of the aggregated publication abstract affiliation data. In an embodiment required data comprises: officially recognized institute names as well as commonly used short forms and acronyms for the institution. Secondarily, the departmental structure is also obtained. Institute addresses also form part of the data. Address and Geo code data is obtained from databases 235. Sources for addresses include publication abstract affiliations, institute websites, lookup via maps.google.com or other similar mapping resources. Also used in an embedment is address geocode data (latitude, longitude) which may be obtained from publicly available address/geocode lookup services such as for example that at http://www.aus-emaps.com/simple_geocoder.php.

Controlled scientific vocabulary data is also used e.g. NCBI Medical Encyclopedia Subject Headings [MeSH], for biosciences, from databases 235. Sources for this include, for example, the National Library of Medicine (http://www.nlm.nih.gov/mesh/), The Library on Congress has an extensive controlled vocabulary that may be useful for non-biomedical vocabularies (http://id.loc.gov/)

Data related to publications includes journal names derived from analysis of publication abstracts in bulk and, author names which are derived similarly to journal names. Data related to the names of materials & methods, and material providers can be provided for use in system 200 through corporate partnerships with material providers.

In an embodiment of the invention System 200 functions to establish a met-knowledge network. Publication records and associated metadata are imported (for example, from a 3rd party scientific abstract database) from literature sources 221 to a database 202 configured to store the information for least one publication. Publication information may range from a single identifier, to the full text record including figures and all available metadata. Full text publication records are likely to be obtained directly from a publisher, or in the special case of "open access" articles, from an open access article database. For example that at http://www.ncbi.nlm.nih.gov/pmc/, http://arxiv.org/.

Knowledge contexts are defined in system 200 for database 202 by using the information obtained from a 3rd party database 221, or by in-house analysis of publication records. For example, by analyzing the publication records in bulk, it is possible to obtain data for many of these categories. Knowledge context categories include i) individual authors ii) Sets of authors or "Teams" (including author sets defined by geographical region, institutional affiliation, professional affiliation [associations, committees, councils etc], common working environment [i.e. similar laboratory, office, or other research environment], research collaboration, research networks, common interests, common research discipline/field/subfield/topic/goals, common education history, common personal background etc), iii) Institutions to which authors or sets of authors are affiliated including institutes, hospitals, universities, colleges etc. iv) institutional organizational structures including departments, divisions, laboratories, schools etc., v) combinations of individuals, entities and groupings from categories i-iv; e.g. a complex research network, vi) geographical locations defined, for example, by countries, states/provinces, cities, districts, neighborhoods, addresses, precise coordinates [geocodes] etc., vii) scientific domains, disciplines, fields, subfields and topics, for example, physics, molecular biology, cancer, "the biochemistry of gene X".

Descriptive publication annotation categories are defined in system 200 using the data and knowledge contexts including: i) dates and time period relevant to each publication including any range, from seconds up to centuries; dates and time periods can be related to aspects including the process of publishing, for example, date of publication or date of posting in a literature database, or to other contexts of the publication, for example, time periods relative the career of an author; ii) type of publication including original research [brevia, letter, report, article etc), subject review [full review, mini-review], opinion, proposal, summary, proceedings, book review, synthesis, replication, erratum, corrigendum, retraction, correction, snapshot, resource, comment, reply, news, blog entry, podcast, video, interview, preview, and essay etc.; iii) publishing Journal, for example, Nature, Proceedings of the National Academy of Sciences; iv) materials and methods employed in the reported study, for example, technologies, devices, software, processes, methods, protocols, approaches, chemicals, reagents, supplies, equipment, materials, protocols, and analyses methods; v) author interests, i.e. conflicts of interest; vi) unstated assumptions and conceptual underpinnings; vii) publication popularity/reception indicators (categorical data); viii) awards and other publication impact/prestige/importance indicators for example, categorical qualitative data, such as types of awards received, system field-level contribution nomination types, such as whether the publication is a minor contribution, major contribution, seminal contribution, or landmark contribution; ix) plain language brief, for example, a compact restatement of the key ideas, results, findings of a paper, which may include a statement which answers the question of relevance to a given knowledge context or set of contexts; x) article-style written publication reviews, for example, an article written by a system user about a publication Wikipedia style, which may include text and images detailing the background, significance, impact, challenges, and controversies related to any particular publication; and, xi) publication series.

Quantitative annotations are imported by system 200, for example, numerical indicators of publication knowledge consumption and status including; i) indicators of popularity/reception including the absolute number of citing-side documents, number of publication page views, number of publication abstract views, number of Twitter mentions, number of blog articles both within and outside the system, number of bookmarks for publication page, number full text downloads, for example, PDF downloads, or xml downloads, number of publication page link backs, number of Facebook "likes", number of "citeulike" bookmarks (www.citeulike.org), number of Mendeley readers (www.mendeley.com) and other similar data; ii) indicators of prestige/importance including number of 3rd party news story mentions, number of podcasts mentions, number of system field level nomination votes (votes per nomination type), number of publication page discussion questions/comments/replies, number of YouTube mentions, number of invited presentations for a specific publication, number of awards, 5-star rating, and other similar data; and iii) calculated indices and metrics derived by processing numerical data in i-ii, including PageRank style algorithms applied to citation data, for example, see: CiteRank http://iopscience.iop.org, data normalizations, for example, dividing the data for each publications associated with a given context by the mean or median measurement for all publications within that set, and context specific percentile-rank calculations, as well as other methods.

Publication pages 224 are generated for each imported publication record and its knowledge context in publication page and knowledge context page module 227. These pages serve as the central node representing a published work, which presents the available annotations and knowledge contexts that have been associated with the work either automatically during publication import or by the actions of users. The original abstract, essential accession Ids, for example, PubMed ID, for biomedicine, journal name, volume, pagination, date of publication, date of import to the system, and other basic annotations are displayed. Since most of these data has been obtained from 3rd party sources, their accuracy is being preserved and they are not editable. All statistical data specific for a publication are presented here, including citation counts, multiple context-specific percentile-rank scores, for example, a publication is in the 85th citation percentile for publications in the field of prostate cancer research, in the 90th percentile for publications originating from Stanford University, in the 98th percentile for publications originating from California, read counts, comment counts and other quantitative consumption and status data. Fields associated with each publication are broken down in list form, as are publication series that the publication has been added to by system users. Subject heading terms, for example, MeSH vocabulary associated with a paper are listed. Importantly, a "quick nomination" button is available, allowing users to rapidly nominate a paper as a contribution to a variety of fields. Author teams, institutes, organizational divisions (e.g. department of biology) and higher organizational structures (e.g. institute networks) are represented as links, offering jumping-off points to pages for these entities. Similarly, geographical locations associated with the institute affiliation of the authors are listed as links on the publication page 234. Publication authors are represented as a list, with each author name acting as a clickable hyperlink, providing a path to all publications associated with each citation author ID. If a user has associated their profile with a citation author ID, clicking their name links instead directly to that user's profile rather than the automatically generated aggregator page for the citation author ID. Each publication page 224 is provided with a file gallery, to allow users to upload relevant images and data for the publication, for example, a special protocol from the study, additional supplementary data, etc. Users are able to write a "plain English brief" and "article-style publication review" in wiki-style format, providing a compact as well as extended overview of the significance of each publication. This includes background details and summarizations of publication that are not contained in the article itself. A special section is dedicated to materials (reagents) and methods used in the reported study. This area harbors links to the materials page 229 of each material that has been associated with a publication. The materials and methods section can also present images for each of the materials, images of the companies that manufacture the materials, or even full advertisements. On a separate tab are found links out to the journal publisher of the article, or to the full text article on the journal website, and links to other relevant websites and resources provided by users and 3rd party sources. If the full text article is available to display without copyright infringement, the article can be viewed (text, images, and occasionally video) on a separate tab, or alternatively as a document available for download to be read offline. Importantly, each publication page 224 is configured with a "Review+Discuss" page. This page contains a wiki-style democratic question and answer commenting forum. An example of this type of forum can be found at Stackoverflow: http://stackoverflow.com/questions/5556183/make-c-crash-without-casting.

Knowledge context aggregator web pages 233 are generated for entities within each knowledge context category. These pages collect, present or link to publication records, annotations and quantitative publication consumption/status indicators in a variety of textual and graphical formats. Additionally, these pages possess mechanisms designed to collect user inputted information related to activity within the given knowledge context.

Each citation author ID (as obtained from the abstract database) is assigned an aggregator page 226 where publications linked to each citation author ID can be listed. These pages provide a homepage for each citation author in the database, which can be converted from a basic aggregator page, to a system author page upon activation (e.g. a aggregator page with a bio section and statistics data), or to a full system profile page (i.e. when a registered user has linked their profile to a citation author ID). Publications listed on any of these page types can be sorted and ranked according to standard listing methods.). Standard listing and ranking methods include lists of publications shown in full or subsets, according to chosen date spans or other criteria. Sorting and ranking options are available including chronological, alphabetical, as well as diverse measures derived from quantitative indicators of publication knowledge consumption and status. Examples include a "Hot Publications" box (a short list of top performing publications), or a "New Publications" box (a short list of the most recent publications within a given context). A third example would be an extensive listing of publications sorted by percentile-rank (relative the context in question) and organized into subsets by associated Field.

To convert any citation author page to a system author page, any system user can click an activation button, which has the effect of adding additional areas and tabs to the webpage. At such a time, users have the opportunity to remove selected citations that are associated with the new system author, for example, for the purpose of disambiguation between different individual authors possessing the same citation author ID. Citation author pages that have been converted to system author pages provide areas and features to allow the system users to collaboratively write a wiki-style biography for the author, including text and images. If a system user links their account with a citation author ID, the publications assigned to the citation author ID are automatically assigned to that user. Additionally, the author page converts to a full user profile. Similarly if a new system user links their account to an established system author ID with a bio, the biography information is imported into the system user profile biography section, and that user takes ownership of the biography information and citing permissions from other system users are removed.

System 200 also creates author team pages 228. These aggregator pages serve the purpose of providing a home page for sets of authors who frequently publish and research together, for example, the members of an established lab. Key information presented on these pages are activity feeds to display the actions of members of the Team who are system users throughout the site and publications associated with the particular team as well as quantitative publication consumption/status indicators. Several different subpages are accessible via tabs. These contain information pages (e.g. a research summary that can be written by team members), member listings, a team blog, a file gallery to share protocols/data/presentations/other documents with users. Additional data aggregated on this page are the identity and counts of awards assigned to team members, and fields associated with the team through its publications. Graphical displays are implemented to present and summarize statistics associated with the publications and actions of the team members. Other information presented on team pages includes basic details about the team itself including location, number of members, date of establishment etc.

System 200 also configures institution pages 230, including pages for institutions, institutional divisions, and research networks. These aggregator pages serve to collect and display content produced by teams associated with each division, institution and research network. The information presented and functions available on these pages are similar to those of the team pages, however each institute page pulls data from the teams below it. A hierarchy can be constructed, placing networks of institutes above the institutes themselves; the institutes in turn above departments or divisions, which finally encompass collections of teams. Information, publications, and actions associate with team members therefore propagates up the hierarchy, with each parent level aggregating the information from all levels below it.

Other pages created by system 200 include geographical regions pages 234. These aggregator pages serve to collect and display content produced by teams and their parent institutes/networks found within a given geographical region. A key graphical display for this knowledge context aggregator page is the Google Maps interface, which presents the geographical region in question, as well as map markers for each of the teams/institutes found within its boundaries. Publication listings are shown utilizing standard listing and ranking methods. Activity feeds on these pages stream new actions and information generated by individual system users, teams, or institutes, localized within the region. Basic statistics and graphical summaries for the region are shown including fields associated with publications from the region, numbers of users, teams, or institutes. Additional aggregated information includes number and types of awards for users in the region.

Users are only permitted to associate themselves with their real-world Author name, and with knowledge contexts such as Institutes, Labs that they are associated with outside the web.

It has been noted that research tends to be conducted by teams. Principal investigators tend to be well known, but often the work that meets the interest criteria of the searcher is being done by other team members, for example post docs. The post docs initially tend to move from institution to institution. In essence, the content that may be of greatest interest to searcher may consist for example of bodies of work distributed across two or more locations, over a period of time, and where the common element may be the movement of key post docs or a collaborative relationship between the institutions. Following the progress of this type of body of work is not enabled by prior art solutions.

The embodiment provides mechanisms that allow publications to be promoted to members of a field and to groups of users (teams, networks, institutes etc). Users can nominate publications to a field at four levels of importance: 1) supporting contribution, 2) major contribution 3) seminal contribution 4) landmark contribution. Each contribution nomination is voted on (up/down) by other users, allowing the opinion of the group to be taken into account. Additionally, each publication can be brought to the attention of groups of user using the "broadcast" feature. Broadcasting a publication to a user groups adds it to their newsfeed. Since the number of reads an abstract has accrued is counted, broadcasting a publication can induce a spike in its readcount. Broadcasting a publication may also induce the recipients of the broadcast to "re-broadcast" it to other users (if they find it particularly relevant or important). If this pattern continues, a publication can spread in a viral manner throughout the system network. Both nomination votes and publication read-counts are plotted on the quantitative timelines and graphical interfaces found on field pages, allowing highly read and highly nominated publications to be identified quickly via visual examination of the graphs.

The embodiment provides an effective and efficient set of tools for identifying research content of interest, as well as its origins both in terms of identity of contributors and location(s) where the research content of interest is being generated.

The embodiment may be operable to automatically publish research content in defined areas by disseminating to specific researchers with a matching interest profile stored to the database, once content has achieved a minimum threshold of visibility in the relevant research social network.

An additional type of page created in system 200 is a field page 232. These aggregator pages provide a central collecting, linking and discovery point for each field, subfield and topic in science. As well, they aggregate publication series that are relevant to a field. The field page is organized around a graphical interface which can be set to display a variety of graphs including a timeline, for example, see FIG. 4 and additional description further below, timeline-map and other parameters that allow the integration of quantitative annotation to show publication importance and popularity. Further, using flags and highlighting, publications which have garnered special awards and grants can be identified visually from the graphs, for example, a Nobel Prize winning paper can be highlighted using a yellow medal icon. The main page displays this graphical interface above areas that present new activity and content, highlight new publications, new blog entries comments, new nominated papers, and other content originating from forums associated with the field. On a second tab, there is an overview page, similar to a Wikipedia. This can be written collaboratively and can be edited by field members who are system users who have associated themselves with a field. This overview page contains images and text. Additionally, a collaborative review page is available on a separate tab, where, instead of an overview about the field (goals, major contributions, minor contributions, challenges, prospects etc), the review can tackle the research subject matter itself. This is similar to the classic review article but written by many authors and perpetually growing. Authors who have published in each field (i.e. the authors who have published papers nominated as contributions to a particular field) are listed on a separate tab providing a directory of field members. As on other pages, if an author is also a system user, their avatar image is shown in the index. Publications nominated to a field are shown on a separate tab, and these are listed using standard methods, and can be searched and filtered. Teams and institutes associated with a field are listed in a directory within a separate tab (e.g. see FIG. 9 and additional description further below). Another tab contains are a directory of materials used in publications that have been nominated to a field, along with data indicating the popularity of each material, for example, the number of publications within the field which used each material. Finally, another tab contains a discussion forum, which functions similar to the "Review+Discuss" forum on a publication page.

System 200 also generates special annotation aggregator pages 236. Special annotations are categories of annotations that are not considered knowledge contexts, but provide high importance information to readers and link similar publications.

Special annotation pages 236 include award and grant pages 238. Awards play an important role in scholarly research, and therefore provide a valuable means of identifying high impact work. The award or grant pages 238 present lists of publications or authors who have been recipients, along with basic statistics for the publications, for example, a breakdown of associated Fields. Each award page offers a wiki-style, user generated, overview section, and an image box. Additionally, award pages are configured with a discussion forum to allow users to discuss issues related to the award.

Figure 15:
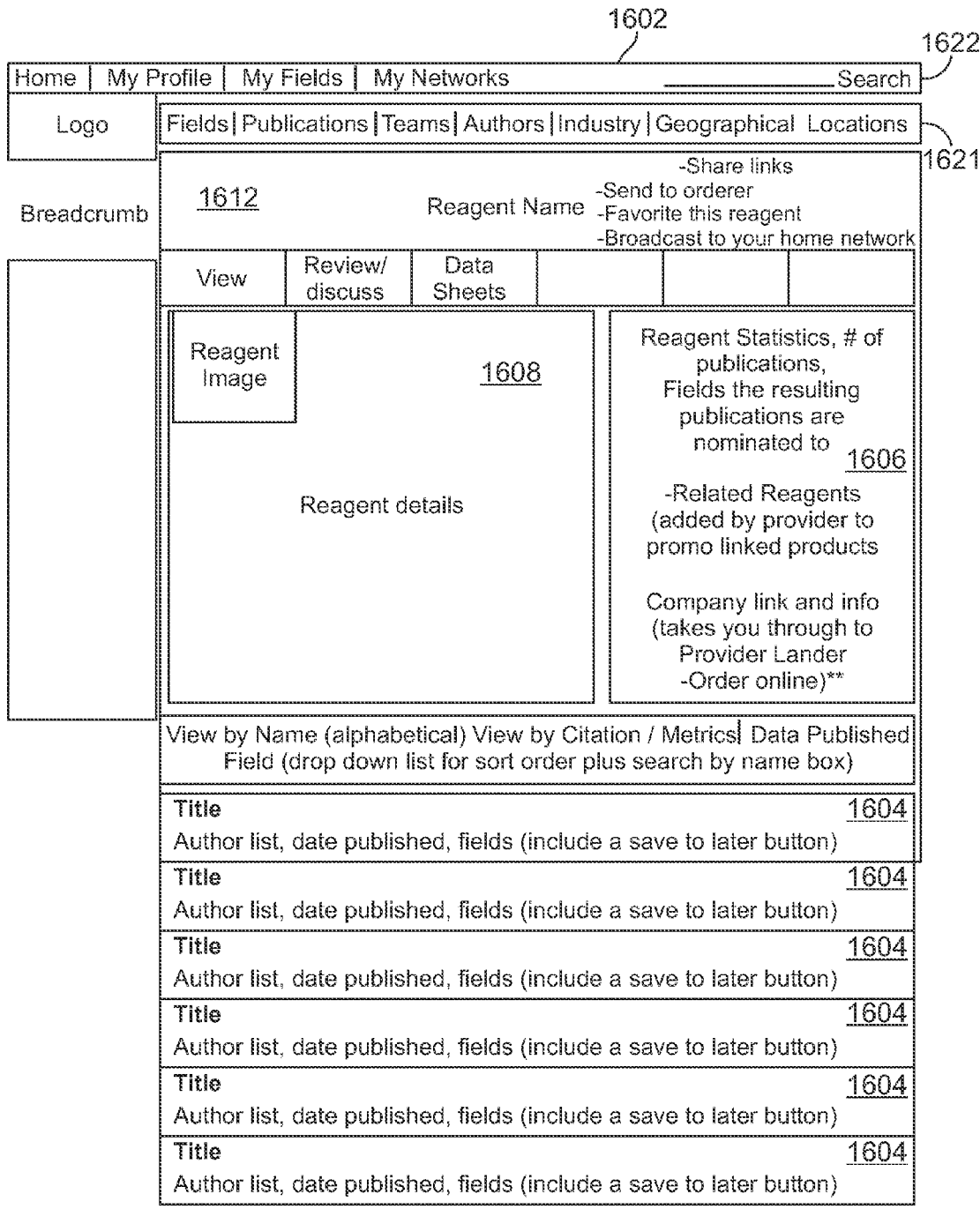
FIG. 15 shows an example of an illustrative reagent page according to an embodiment of the invention.

Special annotation pages also include materials and methods, and materials provider pages 240, 241. (As shown in FIGS. 15 and 15 and described in further detail below.). Materials and methods pages 240 serve to aggregate the publications that have been linked to a particular material or method. Graphical displays, such as pie charts, are utilized to summarize the fields in which a material/method is being used, as well as statistics reporting usage patterns (e.g. numbers of publications). A discussion forum is available on a secondary tab. They also provide a place for companies to place advertising, suggest related and new products, link to external company product pages, and upload new datasets and protocols. Similarly, Materials provider pages 241 aggregate listings of materials produced by each company, as well as the publications from their associated materials pages. Materials can be sorted according to popularity (i.e. the number of papers that report their use). Material provider pages 241 can be also used for companies to advertise new produces and promotions.

The special annotation pages include publication series pages 242. Within each well established field or subfield, there are new topics under early stages of investigation, which only have a few publications to their credit. These may eventually evolve into new subfields. As there is no universally agreed upon definition of what considered a field or subfield of science, system offers a tool to conceptually link publications on very new topics that have few dedicated researchers: the "Publication Series". A publication series is simply defined as any small set of publications that are related in some aspect. Publication series pages 242 provide an aggregation page equipped with a wiki-style overview article and discussion forum, but no graphical interfaces. Links to series authors, teams and institutes are presented for those who have publications associated with a series. Publication series can be highlighted on the graphical timelines and other interfaces of associated field pages. As a publication series matures it accumulates a large number of publications and investigators have the option to convert it to a full-fledged field page.

The special annotation pages also include vocabulary terms page 244. (e.g. see FIG. 14 and additional description further below). These simple subject headings and keywords are provided with only the most basic aggregator page. It comprises a listing of publications using standard methods, and a field summarization graph or pie chart.

Additionally, the special annotation pages include journal pages 246. These publication categories are provided with a basic aggregator page, including a listing of publications originating from each journal listed using standard methods, as well as options to organize the publications in groups by year/volume/issue and a field summarization graph or pie chart.

A main page for non-logged/unregistered users is generated (e.g. see FIG. 2 and additional description further below). This is the general lander 248 for the system that loads at the main web page of the system. As it is expected to have the highest user traffic, it is designed to present a broad overview of activity throughout the site, as well as highlight the newest and most exciting publications, authors, comments, teams and website news. To provide a graphical depiction of the daily influx of publications (~2-4K/day), a large geographical "ticker" map interface is presented. This map flashes markers for each new publication located at the address of its affiliated institute, with a new marker shown each time a publication is added to the database. As daily publication updates occur in the form of a bulk upload, publication marker flashes will be spaced out at semi-regular intervals across the period of a day. Intermixed between publication marker bursts, user actions across the site will be mapped based on user IP, unless users choose to turn off this feature for their profile. In another graphical interface that can be substituted for the geographical "ticker" map, a tree-like taxonometric rendering of the knowledge contexts or the system website structure can be shown, with areas of high user and publication activity being color-coded, for example, on a heatmap, or proportionately scaled, for example, on a size map. knowledge context pages).

User logged-in homepages 256 (newsfeeds) are generated for each individual who registers on the system via a valid email address. Users are divided into two classes. The system authors and the system community members, defined according to whether they have linked their profile to a citation author ID. At the time when a user links a citation author ID to their system profile, the user is presented with the full list of publications associated with the chosen citation author ID, from which they must remove incorrectly attributed publications (arising from citation author ID ambiguity). Users are provided with a customized homepage, similar to a Facebook newsfeed, that has been designed to allow large lists of abstracts and events to be viewed efficiently (similar to the Apple Ipad email client when used in landscape mode). At the time of registration, the user newsfeed is empty, therefore the user must browse the site to find publications, fields, series, authors, teams, institutes, geographic locations, and many other annotations to follow. To stream content from any page/entity of interest to a newsfeed, a button marked "Follow" can be found on each page (knowledge context pages, special annotation pages etc). This feature allows users to spend their time on the site consuming content, doing actions, reviewing publications and annotating publications, rather than searching for relevant and important information. Followed entities are listed in the left vertical navigation bar of the logged-in homepage. If desired, users are able to undertake the same complex searches that are available in PubMed (Boolean searches), and these searches can be saved and followed as part of the newsfeed, for example, each time new results emerge that match the search query, the results are mixed into the newsfeed. The contents of the newsfeed are also formatted and emailed to users as a single daily or weekly report, allowing it to be reviewed offline. In addition, publication abstracts can be "marked-for-later" using a button found on each publication page and on publication listings. These saved abstracts can viewed later by navigating to a tab on the logged-in homepage. Similarly, to assist in purchase management, materials can be saved in a list which may be accessible via the logged-in homepage. Alternatively, a "shopping-cart" like feature may be instituted, where users can load their saved materials into the shopping cart and have them sent to an online ordering module within the system. The logged-in homepage also contains a tab which displays the user's abstract viewing history (akin to the "History" function of modern web browsers), listed by date. This feature allows users to easily relocate interesting publications they viewed in the past. Finally, the logged-in homepage contains a messaging module which notifies users of messages from other system users, and stores them for later viewing. In another embodiment, a graphical interface is placed on the main page homepage of the site that is configured to dynamically present new publications and user activity throughout the site on a geographic map or on a diagram depicting the structure of the site (e.g. a taxonomy tree for the knowledge context pages).

User profile webpages 254 are generated for each individual registered on the system. User profiles primarily provide an aggregation page to display the activity of the profile holder to other users of the site, and publication listings for the system authors. In addition users are able to upload a profile photo and write a biography, as well as display an award list, essential contact info, and a PDF curriculum vitae that will be available for other users to view. Fields of contribution are summarized along with essential statistics, and the system authors have a dedicated tab for their publications which can be listed by various methods. The left navigation bar contains administrative task menus. Each user profile displays a "message me" button, allowing other users to contact the user without the use of email.

Now referring to FIGS. 2-16, shown are various web pages illustrating various features of the user interface of the present system in accordance with various embodiments.

Figure 2:
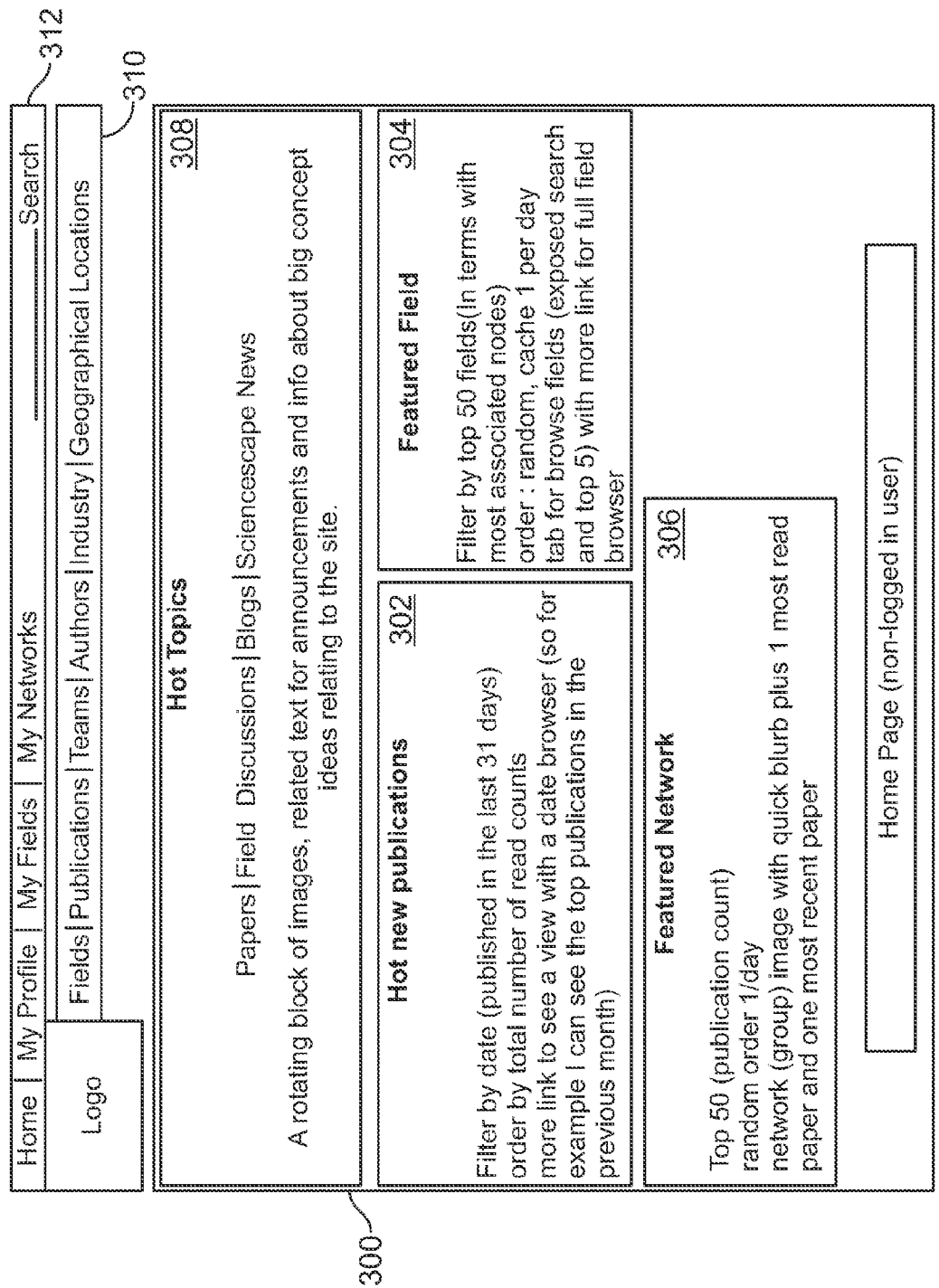
FIG. 2 shows an example of an illustrative home page in accordance with an embodiment of the invention.

FIG. 2 shows the Home Page 300 of a non-logged in user. Home page 300 has navigation bars 312 and 310. A window labelled Hot new publications 302 provides a potential custom module for tracking the total clicks on a biblio CT Title link (from anywhere in the site), which could be integrated with web analytics if necessary. A Featured Field window 304 will shows a live graph (e.g. the peak graph), clickable to show featured publications. On the home page 300 links may be provided for each user type, and clicking through the links may take a user to a quick video demo of how each user can get the most from the site. A link to a blog may also be provided for announcing new features, big concept ideas, events etc. Home page 300 also includes featured network 306 and hot topic 308 windows.

Figure 3:
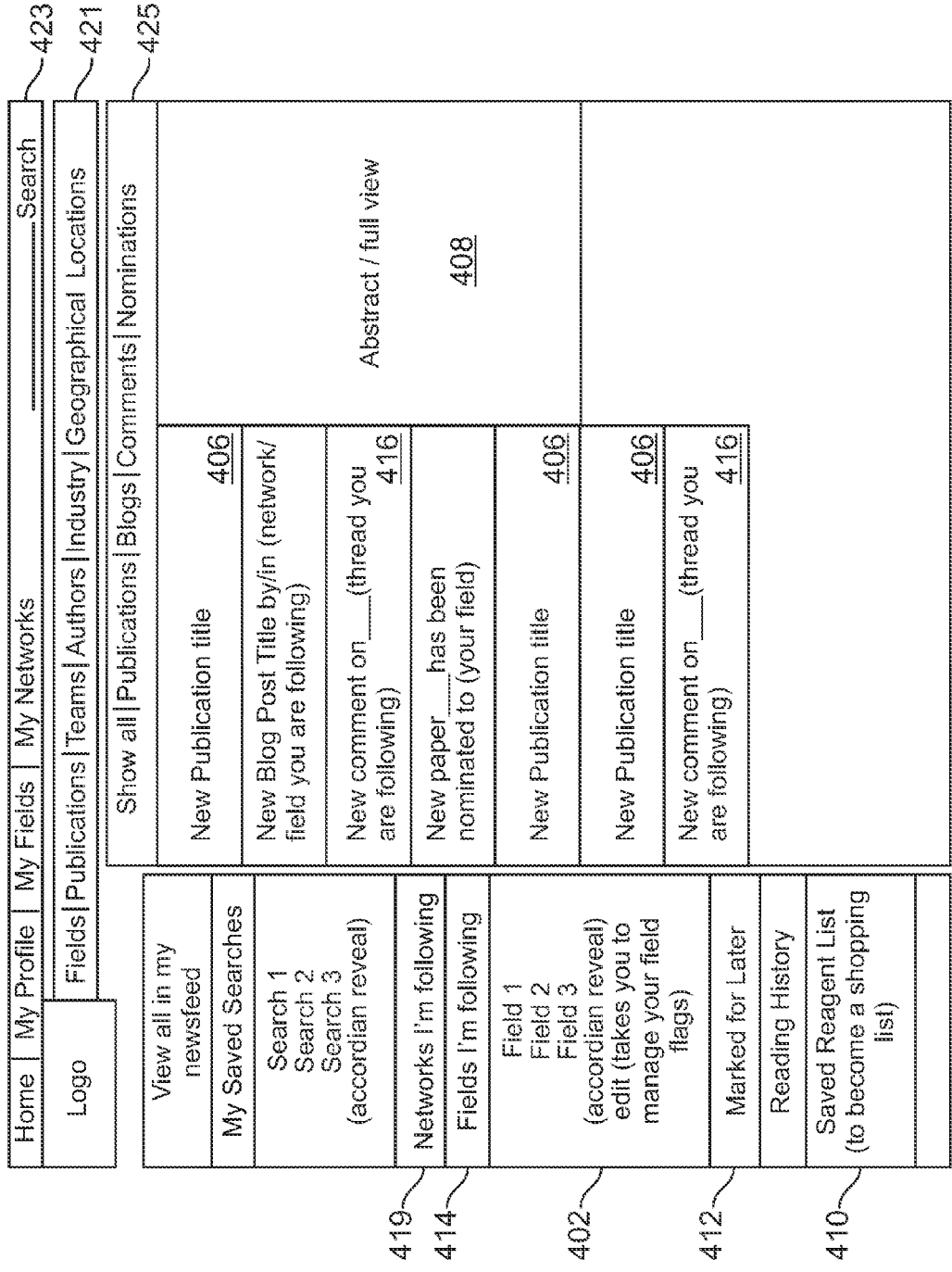
FIG. 3 shows an example of an illustrative personalized home page in accordance with an embodiment of the invention.

Now referring to FIG. 3, shown is a personalized home page 400 for a user, which may include navigation bars 425, 421, 423 and a side bar 402 resulting from the user "following" a Field, network, a location, Journal, etc. These may be added to a newsfeed and may be displayed as filters on the left side bar as illustrated. In this illustrative example, results are filtered by content type. Clicking on a node title indicated by New Publication title 406 enables the node display in the Abstract/full view window 408. In addition, there may be the ability for users to react to this activity by posting a comment on the feed 416, which syncs to comments on the node. A flag on a node indicated by "Marked for Later" 412 may indicate that the site is bookmarked for later reading. A "Saved Reagent List" 410 at the bottom of the left side bar may be a list of all the Reagents the user has bookmarked, which can be easily printed off with ordering data or emailed to administrator of their lab for quick ordering later. In an illustrative embodiment, the user may receive one email update per day at, and the system will update them as to the broad overview of what has happened on the previous day/night on the site just for their fields of interest 414 or other things they are following, such as networks 419.

Figure 4:
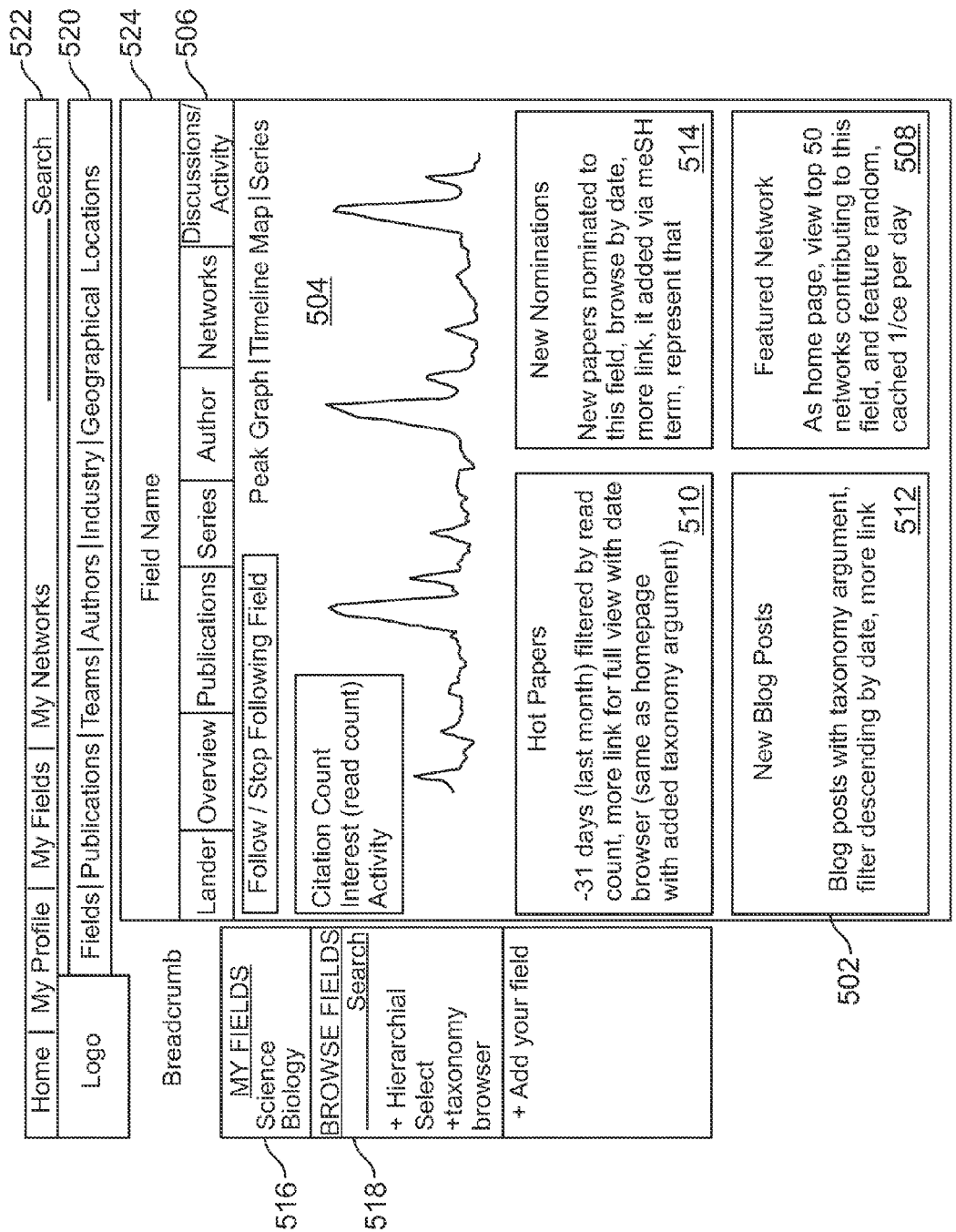
FIG. 4 shows an example of an illustrative scientific landing page in accordance with an embodiment of the invention.

Now referring to FIG. 4, shown is an illustrative example of a scientific field landing page 502, which lists the Fields the current user is following. A peak graph or timeline map 504 may show graphically the citation count, interest, or activity versus time, for example. Additionally there may be other map types including an annotated timeline and series which will track series within this field. Landing page 502 includes navigation bars 520, 522 and 524. Reading the labels across the top bar 506, an Overview will be created automatically with rules every time a term is added to the vocabulary. Next, Publications provides a simple list of all publications in this field, with a few exposed filter criteria/ sort criteria is provided. Series provides a view of all series that has been tagged within this taxonomy term. A Series is a subset of ideas within a field that are not yet robust enough to require their own fields. Next, Authors provides a simple view with all authors that have published a paper that has been tagged with this taxonomy term, and adds in a few exposed filters/sort criteria Link through to a profile if it exists. Next, Networks provides a list of all networks and affiliations that publish papers in this field. Finally, Discussions/Activities provides a simple forum that will be auto generated upon creation of a new taxonomy term within this vocabulary. Also there may be a heartbeat list of all current activity (same as home/profile newsfeeds). Side bars 516, 518 allow a user to display their fields and browse fields.

Still referring to FIG. 4, in the Featured Network window 508, blocks very similar to the blocks on the anonymous home page may be provided which will track publications that have been recently tagged with the user selected taxonomy term. Page 502 may also include a Hot papers window 510, new nomination window 514, new blog posts window 512. It could also show a Related MeSH terms window showing terms currently affiliated with the field displayed and, an Active Field members window with information on members activities in the field such as comment counts, nomination counts, posts count, etc.

Figure 5:
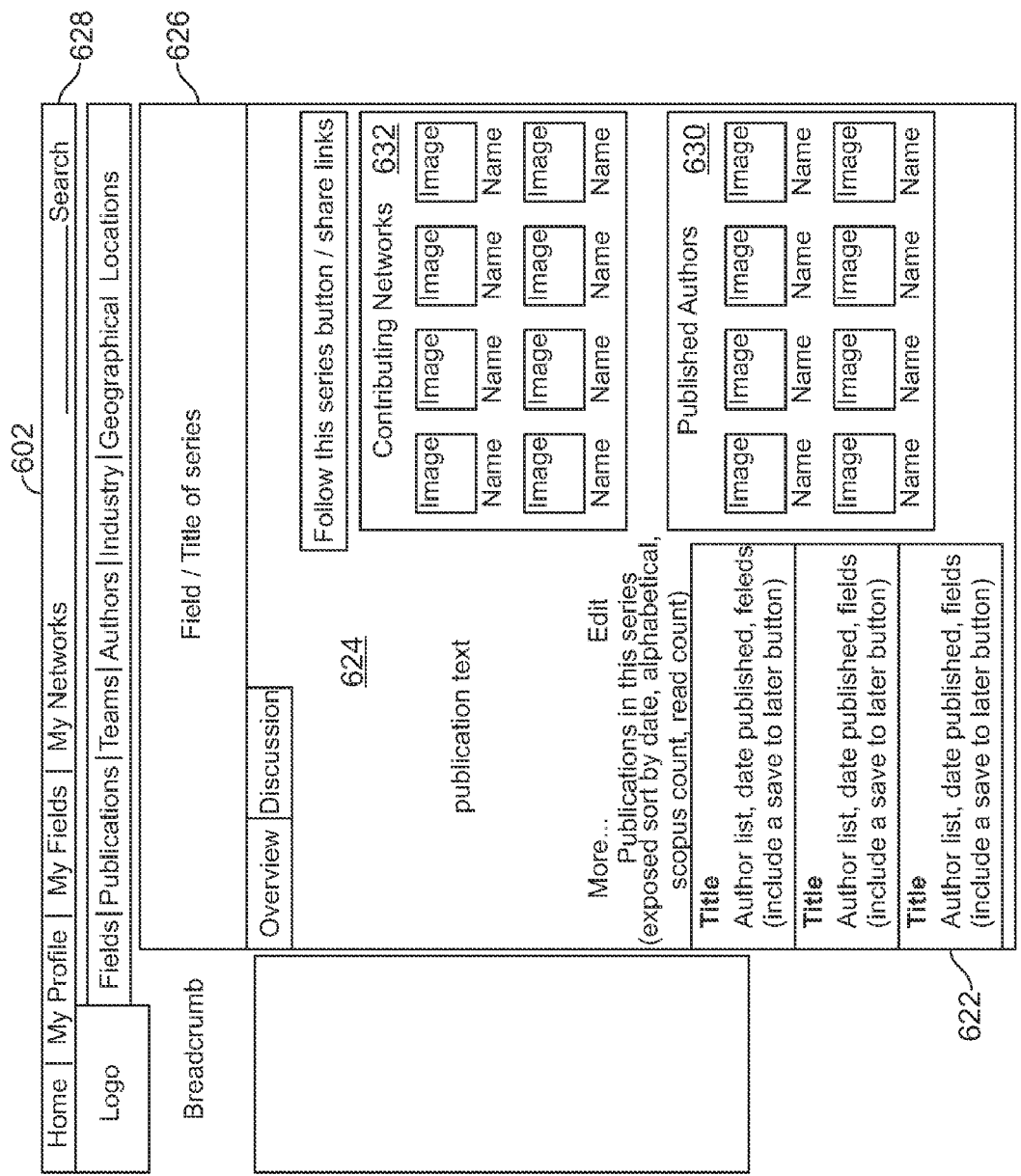
FIG. 5 shows a an example of an illustrative series landing page in according to an embodiment of the invention.

Now referring to FIG. 5, shown is an illustrative example of a series landing page 602, series landing page 602 includes navigation bars 632, and displays a field/title of a series 626, publication text 624, information on titles 622, contributing networks 628 and published authors 630. Series landing may also include a Quick field button for when the series (usually contained within one field) becomes large with activity and publications, and requires a new field of its own to be created.

Figure 6:
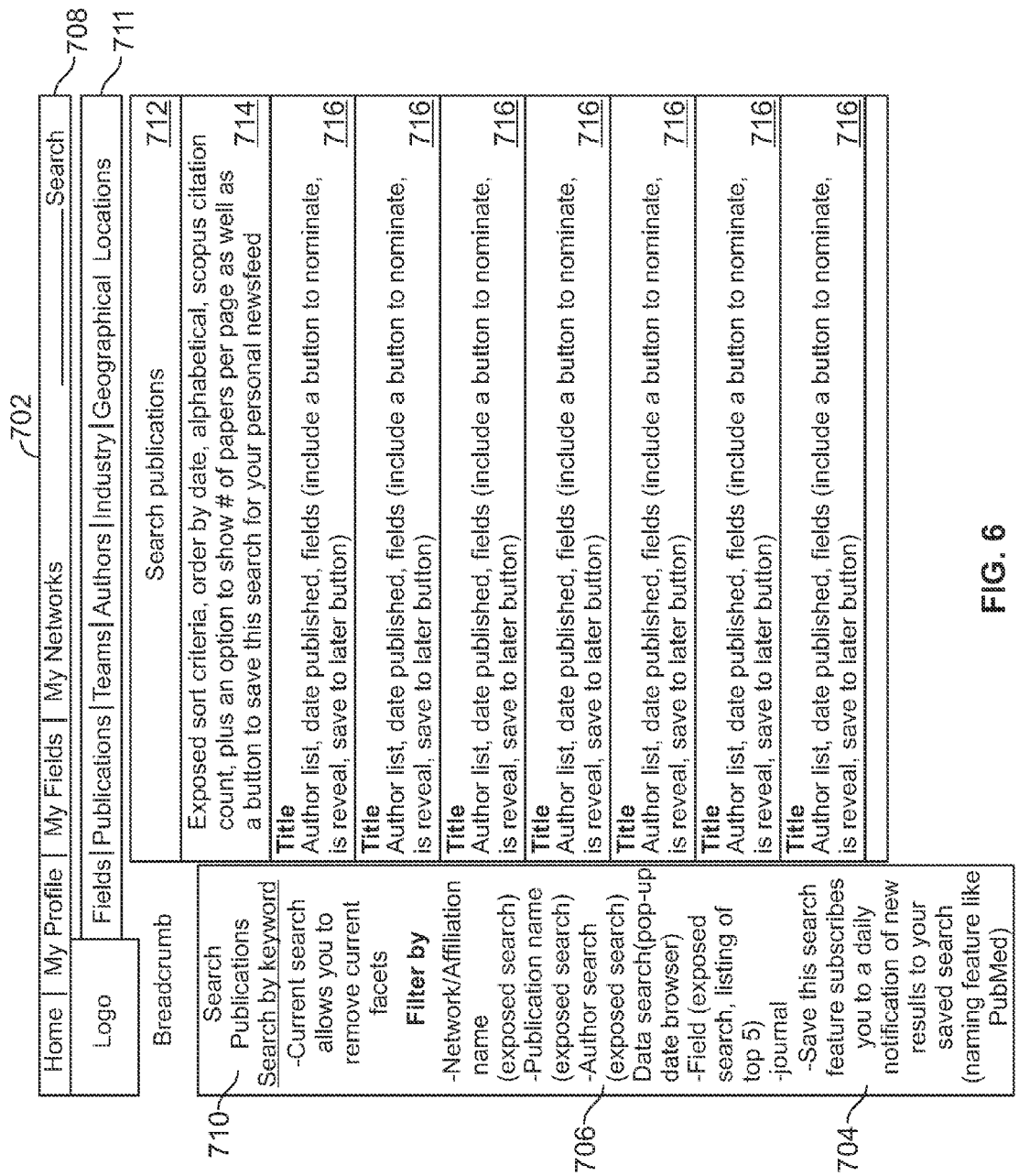
FIG. 6 shows an example of an illustrative publication faceted search page in accordance with an embodiment of the invention.

Referring to FIG. 6, shown is an illustrative publication faceted search page 702. Faceted search page 702 includes navigation bars 708, 711 and search publications feature 712 with sort criteria 714. A list of titles 716 is provided including information on the each title. One of the key features of this system is a faceted search 710 with filter by 706 which replaces the need for PubMed Custom queries. The system may include the feature of saved/named searches 704 so users can see a daily feed of new publications in their master daily email and personal home Newsfeed.

Figure 7:
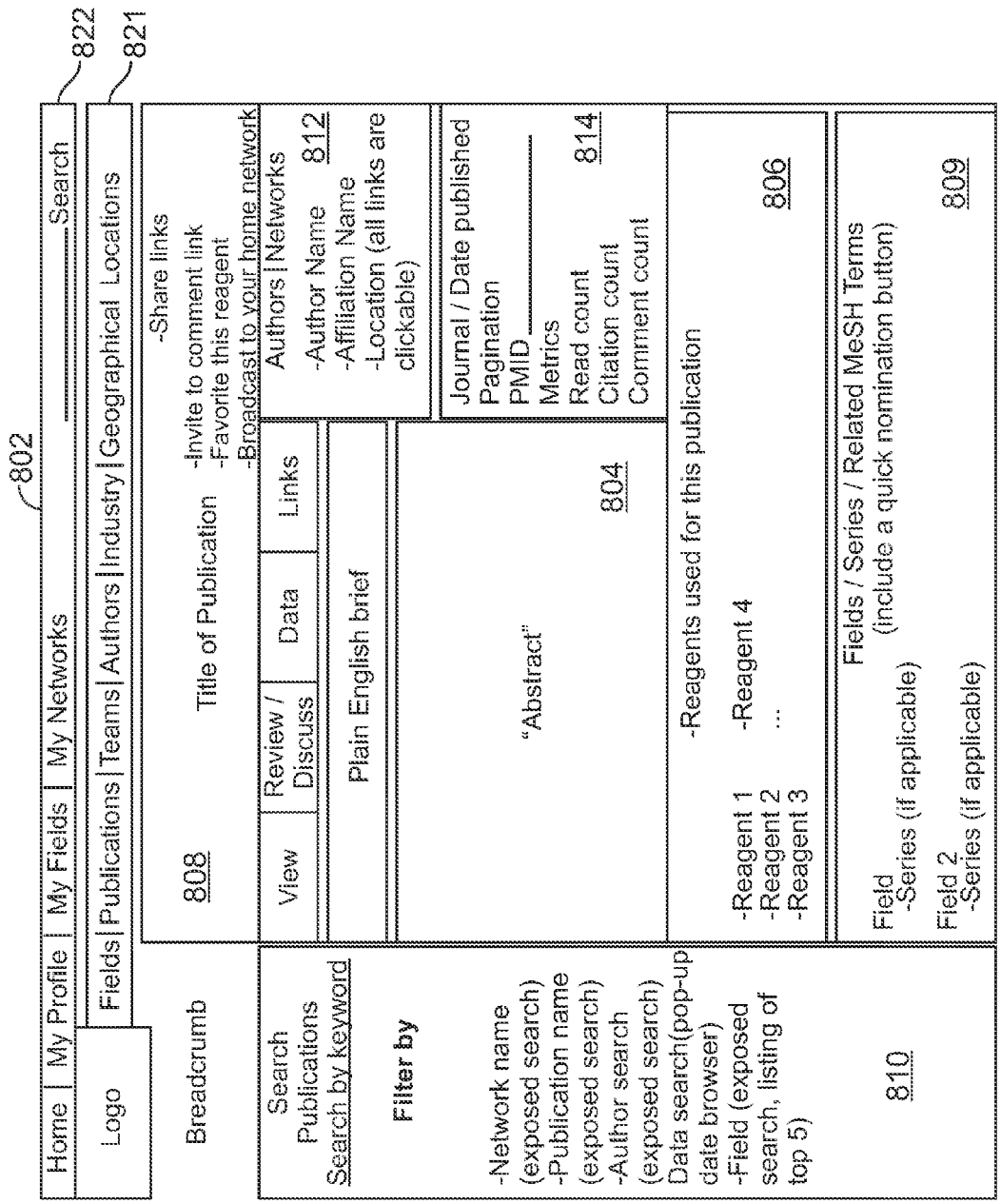
FIG. 7 shows an example of an illustrative publication page according to an embodiment of the invention.

FIG. 7 shows an illustrative publication page 802, which includes various bibliographic details of a Publication 808, including an Abstract 804, Authors Networks 812, Journal Date published 814, field series/related MeSH Terms 809 and a list of Reagents 806 used for the publication. Publication page 802 includes navigation bars 821,822 and a search publication side bar 810.

Figure 8:
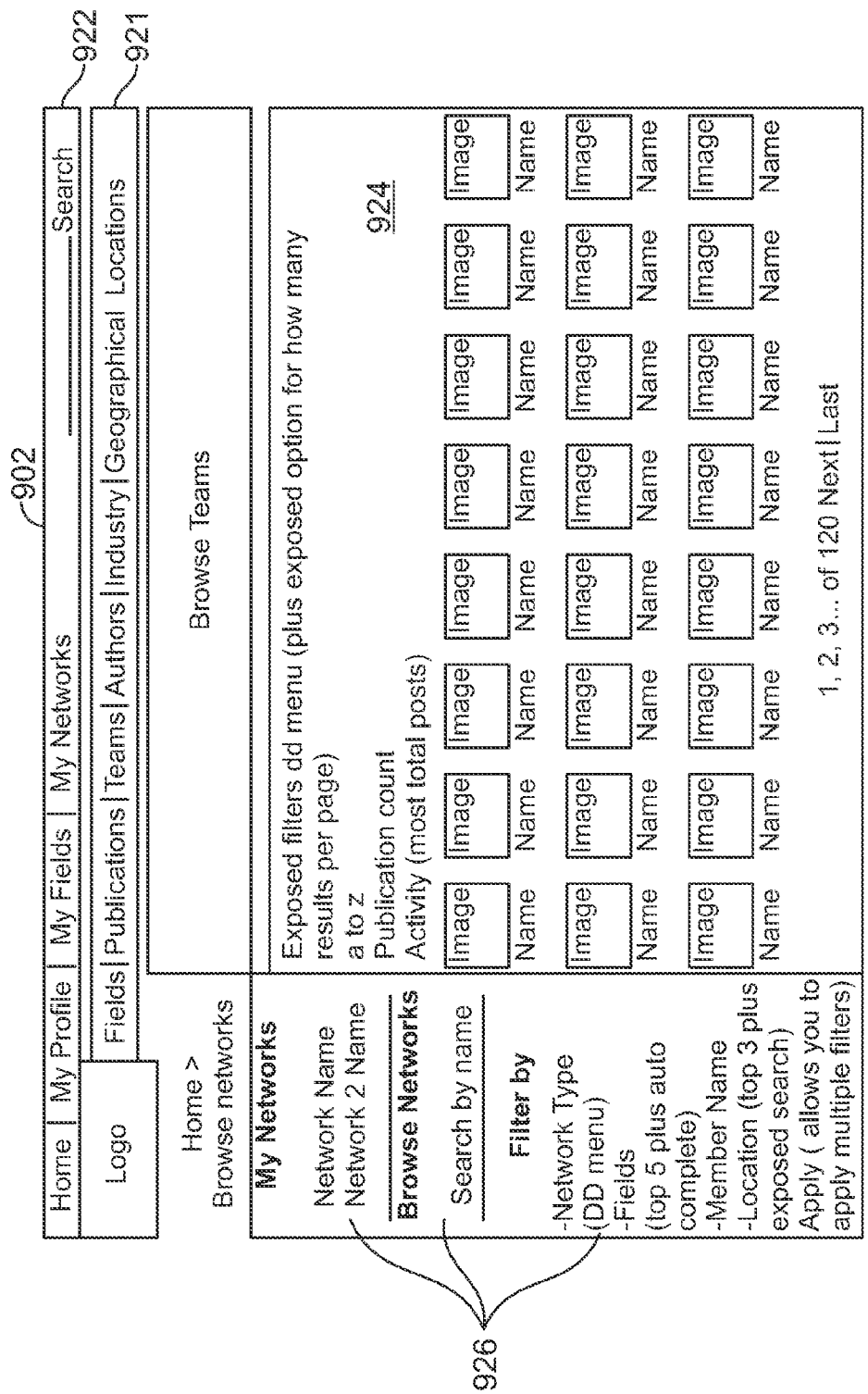
FIG. 8 shows an example of an illustrative team/network/journal/author/industry/faceted search page in accordance with an embodiment of the invention.
Figure 9:
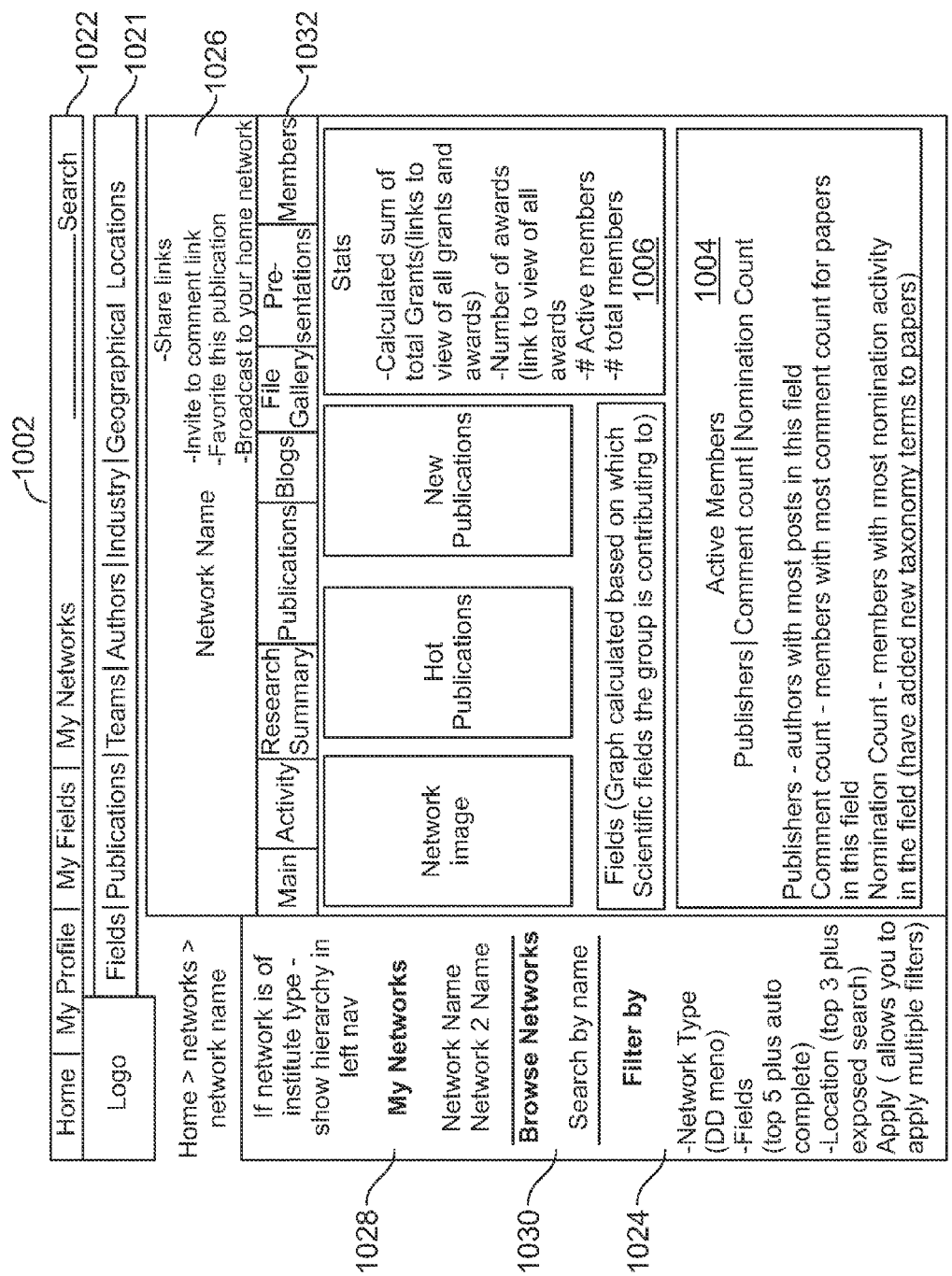
FIG. 9 shows an example of an illustrative team/network/journal landing page according to an embodiment of the invention.

FIG. 8 shows an illustrative team/network/journal/author/industry/faceted search page 902, and FIG. 9 shows a corresponding team/network/journal landing page 1002. FIG. 8 shows Page 902 that includes navigation bars 921 and 922. Faceted search page 902 includes navigation bars 921 and 922 and allows a user, for example, to browse teams and view relevant information 924. A side bar 926 displays the user's networks and allows the user to browse networks with filtering. Landing page 1002 includes navigation bars 1021, 1022 and 1032. Landing page 1002 displays information on a network 1026 including statistics 1006 and active members 1004. A side bar displays the user's networks 1028 and allows the user to browse networks 1030 with filtering 1024. A key challenge in automatically associating publications with networks is posed by the affiliation data that is retrieved from a source such as PubMed, for example, due to its highly heterogeneous and unstructured nature as input by authors to journals at the time of manuscript submission, and due to the format in which it is reported by journals to PubMed and others. The system of the present invention is operable to associate the networks with multiple synonymous affiliation strings so that the platform of the present invention is automatically populated with new mapped papers on its own during updates, in the background. Depending on established conventions and rules of attribution, paper-network associations populate up in the networks hierarchy. For example, if there is a publication in the Medical Department of a university, it may also show up in the parent University. Some networks will have people on the site who want to blog, upload file galleries, control membership, upload presentations etc, we have set up organic-style groups so that people can administrate network membership, and manage content independently.

Figure 10:
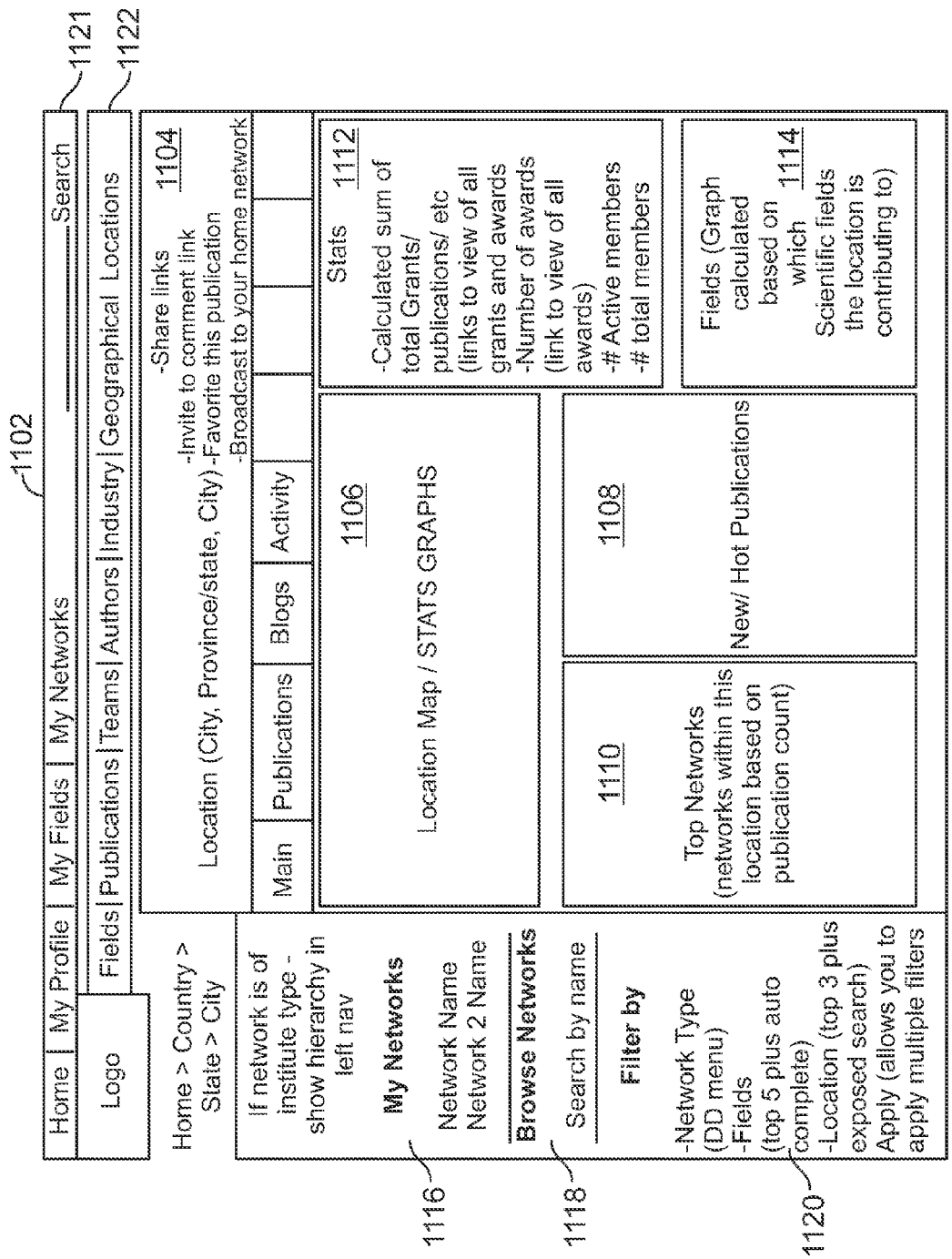
FIG. 10 shows an example of an illustrative lander page according to an embodiment of the invention.

Now referring to FIG. 10, shown is an illustrative location lander page 1102 (e.g. country/province/city). Location lander page 1102 includes navigation bars 1121, 1122. Using page 1102, users can browse information by location so that they can see data relative to their location 1104, such as data on the hottest publication 1108 that was published in a given city, top networks in the city 1110, fields the city authors contribute to 1114, an active field members window on members activities in the field 1112, such as comment counts, nomination counts, posts count etc. Page 1102 may include graphs and a map 1106. A side bar allows display of the users networks 1116, and browsing of networks 1118 with filtering 1120.

Figure 11:
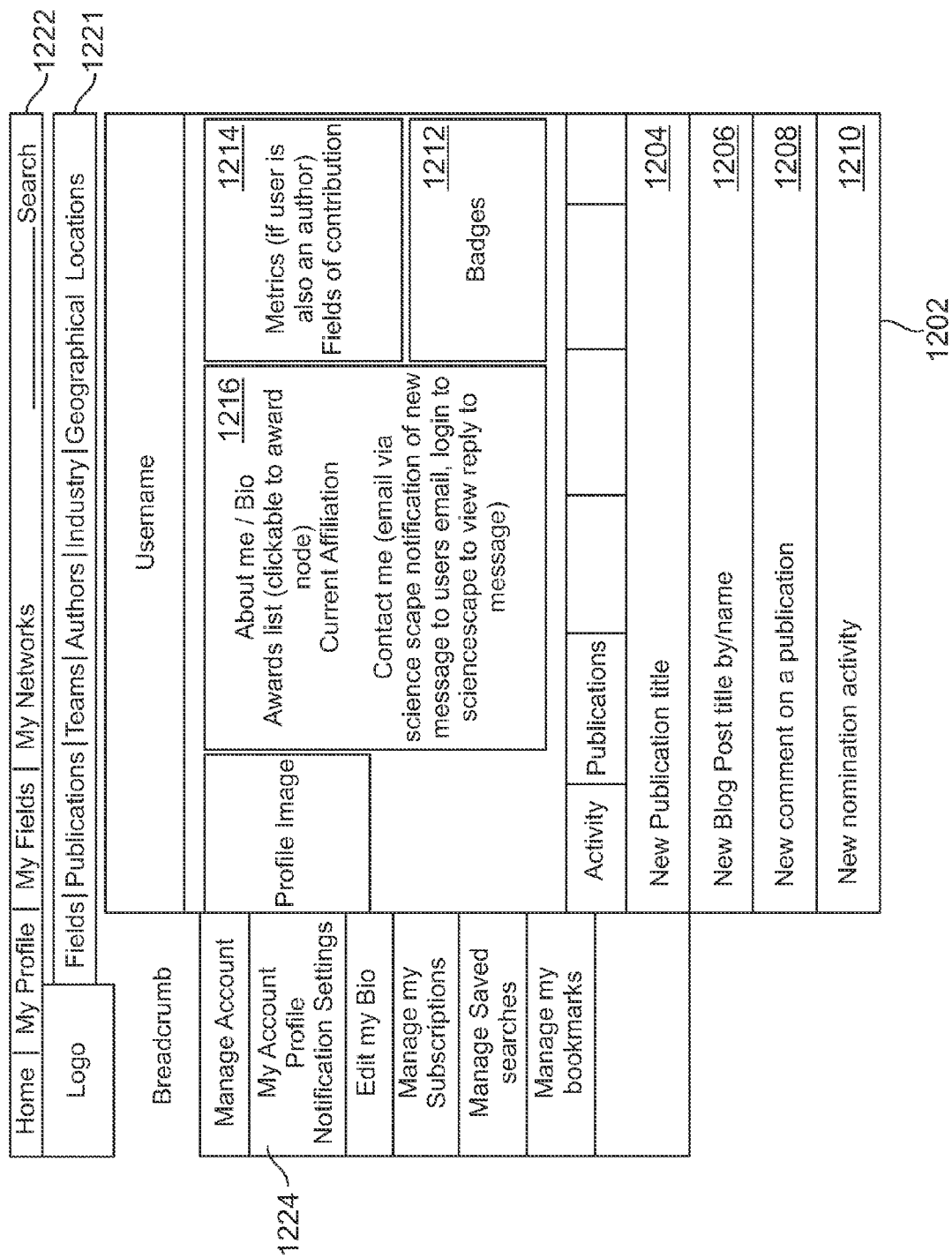
FIG. 11 shows an example of an illustrative profile page for an author according to an embodiment of the invention.

Now referring to FIG. 11, shown is an illustrative profile page for an author 1202. Profile page includes navigation bars 1222 and 1224. If an author has passed on or does not have a profile on the site the system may still aggregate data like a wiki page. Users will be able to add and edit a bio 1216 for this author as well as add a list with node reference click through to awards/grants and prizes this author won in their career. Author metrics 1214 can be displayed. In an embodiment, users may earn badges 1212 based on useful activity within the site, such as adding a bio for a deceased author—historian badge, creating a new field—adding field overviews, etc. A personal newsfeed similar to the home page may show the user's activity within the site. New publications 1204, new blog posts 1206, new comments 1208 and new nominations activity 1210 can be displayed. The users have the ability to react to this activity by posting a comment on the feed. Side bar 1224 allows a user to manage their account.

Figure 12:
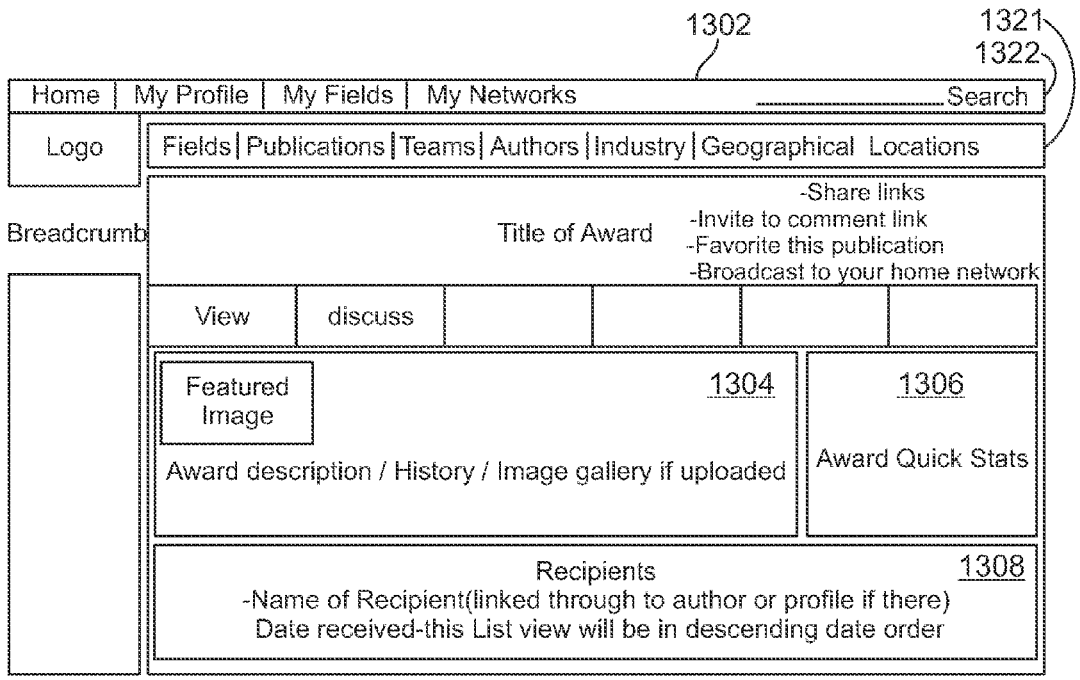
FIG. 12 shows an example of an illustrative award/grant page according to an embodiment of the invention.

Now referring to FIG. 12, shown is an illustrative award/grant page 1302. Award/grant page 1302 includes navigation bars 1322 and 1321 and displays information on an award 1304, including statistics 1306 and recipient information 1308. Awards and grants may be used to populate associated networks. For example, grant funds will calculate so networks can display grant funding amount. Grants may also be linked to resulting publications. A button to add a recipient may pop-up a prefilled node reference to an award and a user can reference an author profile or Sciencescape user profile and date of receipt, and add.

Figure 13:
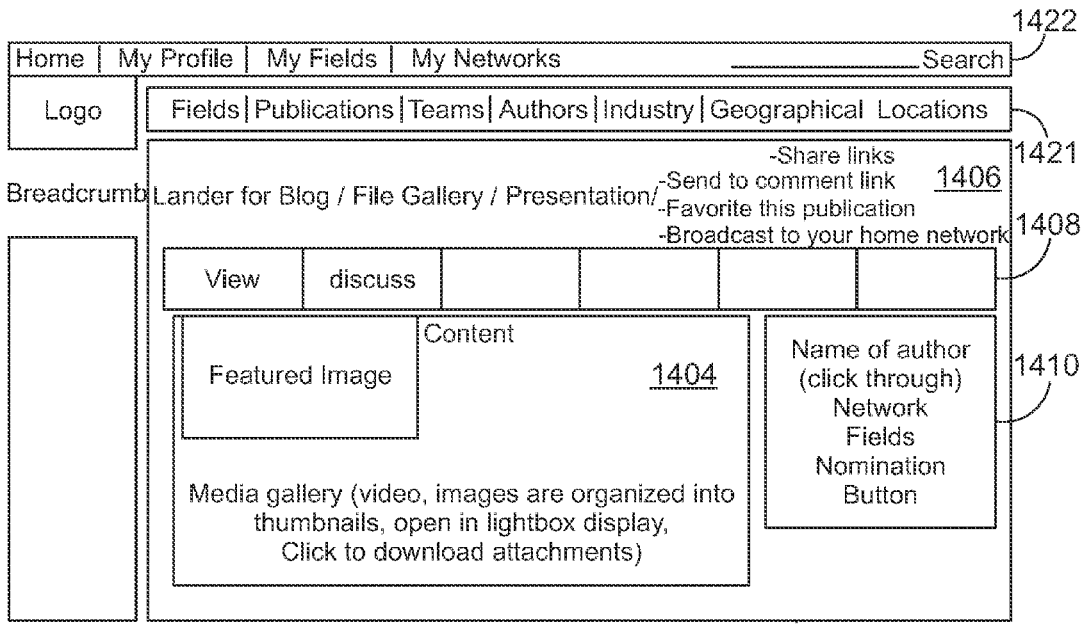
FIG. 13 shows an example of an illustrative default node page according to an embodiment of the invention.

FIG. 13 shows an illustrative default node page 1402, which may be used as the default lander for all blogs file galleries and presentations. Default node page 1402 includes navigation bars 1421 and 1422. The page displays information on a blog/file gallery/presentation 1406 including content 1404 and author 1410, which a user can view or discuss 1408. The system may display read statistics for this as well.

Figure 14:
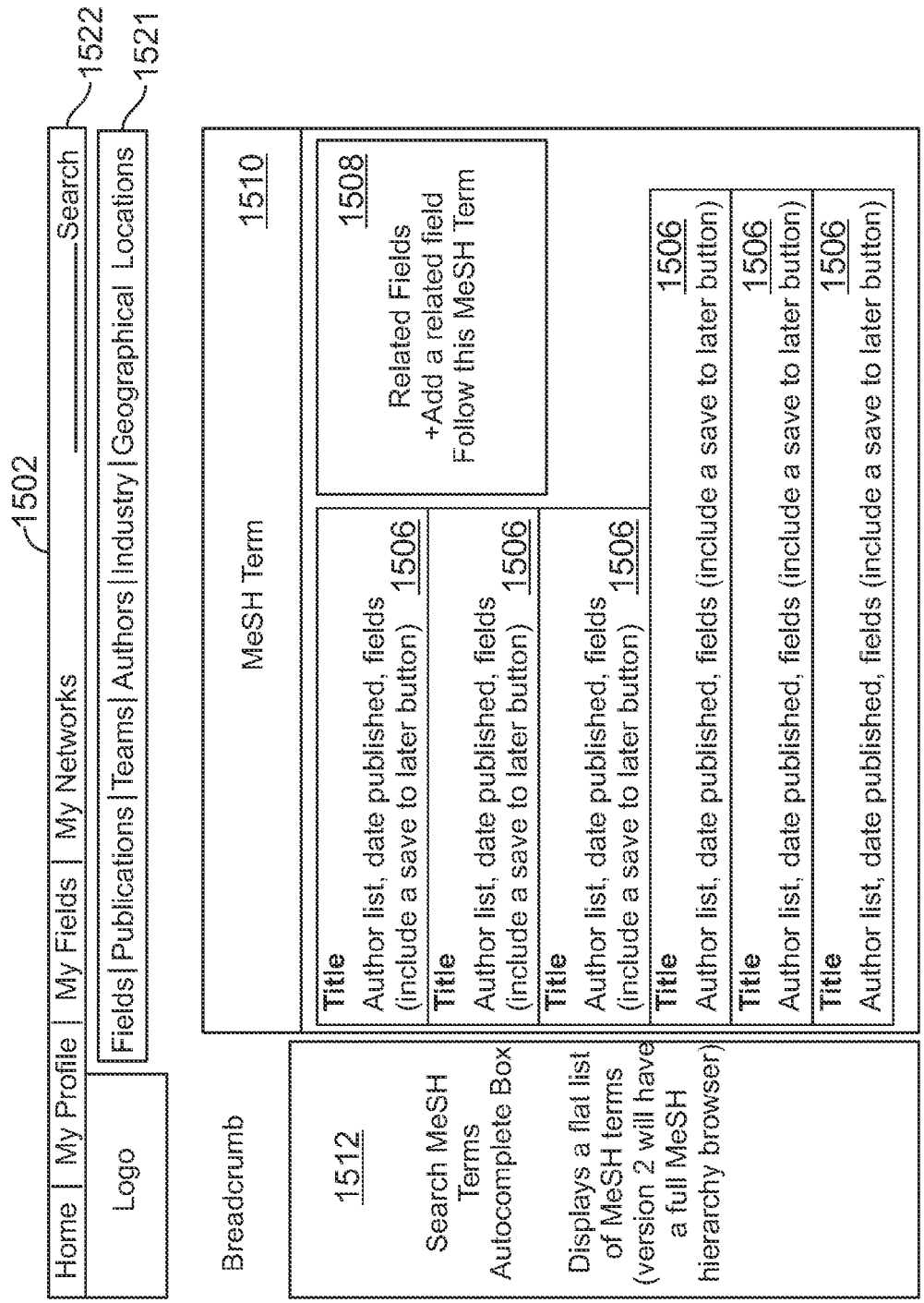
FIG. 14 shows an example of an illustrative MeSH lander page according to an embodiment of the invention.

FIG. 14 shows an illustrative MeSH term lander page 1502. MeSH terms are PubMed's way of categorizing publications. MeSH term lander page 1502 includes tool bars 1521 and 1522. The system has the ability for the user, when creating a scientific field, to add one or more related MeSH terms 1510. The result is that all publications 1506 that have that MeSH term will be nominated to that field (old and new). Page 1502 allows users to display and add related fields 1508 and search MeSH terms 1512. In an embodiment, users are be able to vote up or down on any nomination. Rules may be built such that after a certain number of down votes, the nomination may get removed.

Now referring to FIG. 15, shown is an illustrative Reagent page 1602. In an embodiment, the Reagent page 1602 may provide an online link to order the Reagents from a provider page. Reagent page includes navigation bars 1621 and 1622. Reagent details 1608 on a Reagent 1612 are displayed. Publications referencing the Regent may be displayed in a list 1604. Additional information such as publications, related Regents, and a company link 1606 may also be displayed. In an alternative embodiment, an online shopping cart model may enable a "one stop shop" for users to create a shopping list that spans all Reagent providers, and click to buy all products at once. The system may then send the order details and divide payments out to each provider.

Figure 16:
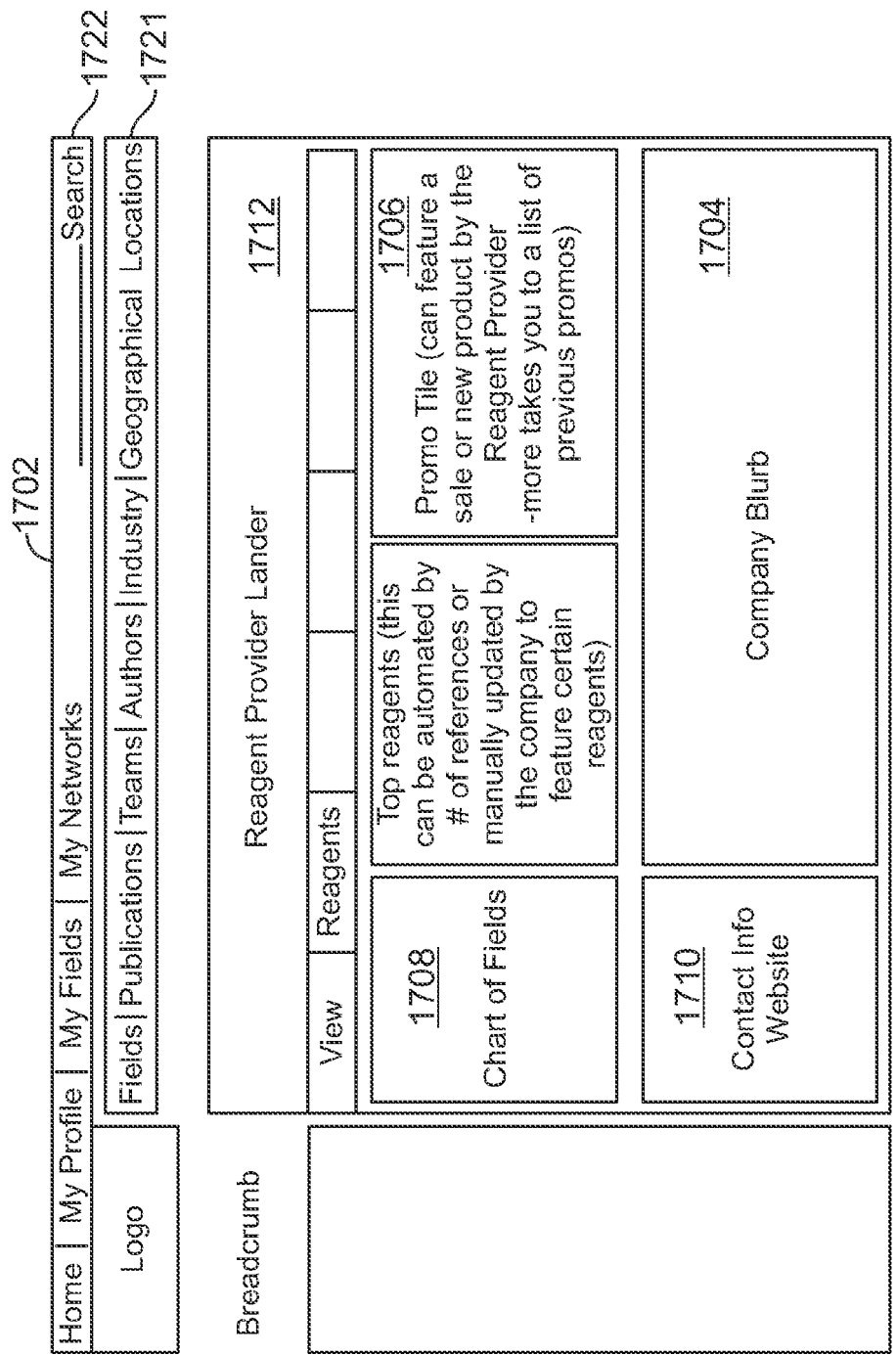
FIG. 16 shows an example of an illustrative reagent provider company page according to an embodiment of the invention; and, FIG. 17 shows an example of an illustrative computer device according to an embodiment of the invention.

Now referring to FIG. 16, shown is an illustrative reagent provider company page 1702. Regent provider page 1702 includes navigation bars 1721 and 1722. This page may provide the reagent list, categorized into product types. Information displayed may include a chart of fields for the provider 1708, provider contact information 1710, a company blurb 1704 and promotional information 1706. Users may search a reagent by publication name, field, etc. This page may also provide a reagent faceted search feature, whereby users will be able to search across all reagent providers for lists of reagents by publication name, or search for publications by reagents used, this may also be provided in a faceted search environment.

Figure 17:
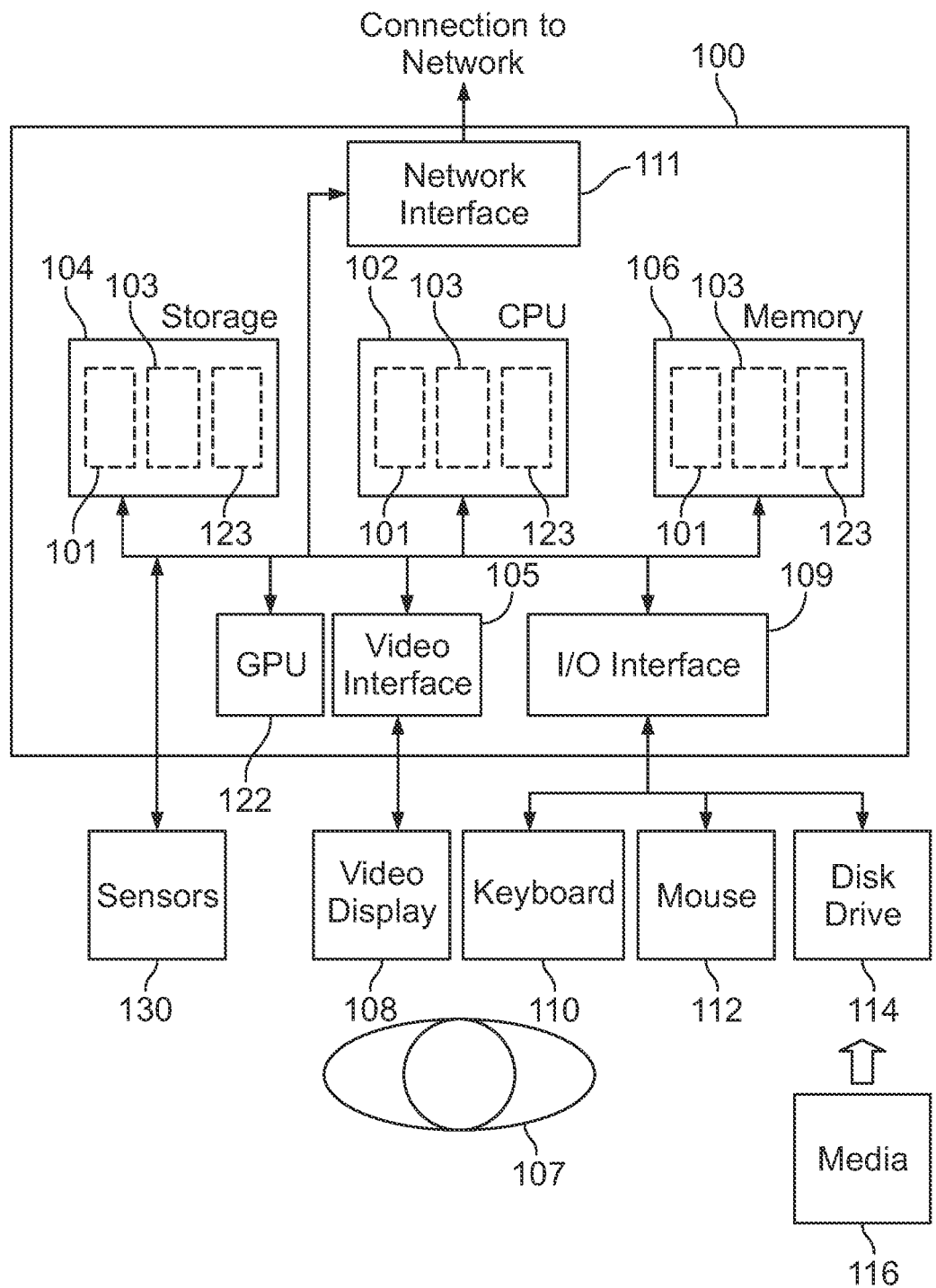

The present invention may be practiced in various embodiments. A suitably configured computer device, and associated communications networks, devices, software and firmware may provide a platform for enabling one or more embodiments as described above. By way of example, FIG. 17 shows a generic computer device 100 that may include a central processing unit ("CPU") 102 connected to a storage unit 104 and to a random access memory 106. The CPU 102 may process an operating system 101, application program 103, and data 123. The operating system 101, application program 103, and data 123 may be stored in storage unit 104 and loaded into memory 106, as may be required. Computer device 100 may further include a graphics processing unit (GPU) 122 which is operatively connected to CPU 102 and to memory 106 to offload intensive image processing calculations from CPU 102 and run these calculations in parallel with CPU 102. An operator 107 may interact with the computer device 100 using a video display 108 connected by a video interface 105, and various input/output devices such as a keyboard 110, mouse 112, and disk drive or solid state drive 114 connected by an I/O interface 109. In known manner, the mouse 112 may be configured to control movement of a cursor in the video display 108, and to operate various graphical user interface (GUI) controls appearing in the video display 108 with a mouse button. The disk drive or solid state drive 114 may be configured to accept computer readable media 116. The computer device 100 may form part of a network via a network interface 111, allowing the computer device 100 to communicate with other suitably configured data processing systems (not shown). One or more different types of sensors may be used to receive input from various sources.

The present system and method may be practiced on virtually any manner of computer device including a desktop computer, laptop computer, tablet computer or wireless handheld. The present system and method may also be implemented as a computer-readable/useable medium that includes computer program code to enable a computer device to implement each of the various process steps in a method in accordance with the present invention. It is understood that the terms computer-readable medium or computer useable medium comprises one or more of any type of physical embodiment of the program code. In particular, the computer-readable/useable medium can comprise program code embodied on one or more portable storage articles of manufacture (e.g. an optical disc, a magnetic disk, a tape, etc.), on one or more data storage portioned of a computing device, such as memory associated with a computer and/or a storage system.

While a USB drive device has been described as an illustrative example of a secure key device, it will be apparent that other similar devices which may store data and may be connected to a computing device via an I/O interface may also be used. However, preferably, the secure key device should be sufficiently small and portable such that it is easily carried. In an alternative embodiment, the secure key device need not connect physically to a computing device via an I/O interface, and may instead be connected wirelessly to the computing device via a wireless interface. Furthermore, the secure key device may be made to be hardware specific for further security, and may also be built with its own processor, making the secure device more than just a storage device.

In a further embodiment of the invention publications become linked to pages for commercial research products such as materials, reagents, software, instruments, chemicals and methods, reported in the publication text. Linking is accomplished via a mapping engine. For example, a publication will be linked to pages representing the 10 antibodies used in the study, if they are referenced somewhere in the body of the document, abstract or title. Each publication page contains a set of links to these research materials. These links may take the form of advertising images, video or text. Other entity pages linked to each publication are programmed to show rankings and other displays of products that are used in the linked papers. For example, a ranking of the top products used in the field of cancer research may be shown. A page may be created for each product, which aggregates the papers that report the use of the product. These pages may have question and answer forums, graphical interfaces such as timelines, and are linked to company pages. A page may be created for each company that sells a product in the website database. These company pages aggregate the products that they sell, the papers that are linked to those products and have graphical interfaces similar to other aggregator pages on the website. Using the geo-tagged location of the institute where each of the papers in the database were published, and the name of the products used in each paper, timeline-linked maps are created which show the location and date of use for each of the products in the database. These maps effectively allow users to find localizations of product usage across the world over time.

A technical challenge in establishing a meta-knowledge network from source data such as PubMed data is the creation of pages for research teams and linking these to their correct publication pages. It is desirable for the system to be configured so that the mapping of new publication pages to teams occurs in an automated fashion and that the bulk of the workload for mapping publications to teams can be handled by the software engine of the present invention. This allows users to focus on other types of activity on the site, and assuring the validity of the mappings, rather than continually making new associations.

To solve this problem, the affiliation string that is provided at the time of manuscript submission and eventually input into PubMed for example, usually by the journal, can be used as a bridge between Team pages and publication pages. Specifically, text mining algorithms can be employed to search for derivations of each officially recognised team name within each affiliation string in the database. Affiliation strings tend to be highly heterogeneous in their information, but often contain official institute names within comma separated units. By implementing an algorithm to search for instances of a Team name, which upon recognition creates a link between a publication and team page, it is possible to automatically accomplish this for the majority of publications that possess affiliation strings. To reduce computational workload for searching, the publication and team can be both treated as nodes within the content management framework. If a third node is created representing the affiliation string, the publication can link to its correct team page via a series of node references, first from the Team node to the affiliation node, and then between the affiliation node and the publication node. This provides the added advantage of allowing any new publication entering the network to automatically be linked to a previously created matching affiliation node, that is, for example, if the publication contains an identical affiliation string to a previously imported paper, and directly to its correct team page. This configuration also allows many affiliation nodes to be referenced by a single Team node, mediating the many-to-one relationship that naturally occurs between publication and teams pages.

To further automate the publication mapping process, rules can be created that exploit the hierarchical structure of academic research organizations. Specifically, individual research teams, such as individual labs, are clustered into departments, and many departments are found within each institute. Similarly institutes are often organized into research consortia or networks. While most levels in the team hierarchy, for example, team names are typically absent from publication affiliation strings, removing the ability to automatically map to all associated team levels based on the data the affiliation string contains, mapping to a lower team page allows the publication to be automatically associated with each level above it. By implementing propagation rules in a views module, the content management framework can automatically display publications for lower teams on the pages of teams higher up in a hierarchy. To allow this, the team nodes must be generated using a node hierarchy module. Thus when a new publication enters the system, the software first creates a publication node, and then attempts to associate this with an existing affiliation node. If this exists, and the affiliation node is linked to a team node via a node reference, then the publication is automatically mapped to a team node. If the team node also exists in a hierarchy, the publication is automatically displayed as associated with each team above it in the hierarchy, following the propagation rule implemented in the views module. If no affiliation node exists that matches the affiliation string of a new publication node, this string can be subjected to a search for known team names (and then automatically mapped if the search is successful) or can await manual association of the publication with team node through the action of a user (and this may result in propagation of the publication upwards in the team hierarchy, if one exists).

Two additional situations may be addressed for the Team-to-Publication mapping system to be configured to match the commonly accepted attribution system for published scientific work. The first is the creation of secondary Team-Publication links that represent collaborating teams, or teams that directly contributed to a publication, but are not formally part of a hierarchy with the primary team. To accomplish this, a module is employed that creates secondary affiliation nodes, or "dummy nodes". These can be used to bridge between secondary team nodes and publication nodes via node references. This design also allows the second situation to be handled, which is that of publications that were published before affiliation data was electronically captured by journals (and therefore possess empty affiliation string fields in PubMed). Team to publication mappings for this set of publications is mediated by way of dummy affiliation nodes, similar to the links between secondary teams and publications detailed above.

It should be understood that various features of the invention may be enhanced using for example data mining techniques, analytics, advanced data mapping and other features or technologies. Various such modifications and enhancements may be made, and are contemplated by the inventors of this application.

What is claimed is:

1. A system for managing dynamic meta-knowledge, said system comprising:
   a database for storing a record of data including of a plurality of publications each including a document body, a title and an abstract, a plurality of meta-data entities and a plurality of quantitative data items;
   a management module for managing said database, wherein a selected publication of said plurality of publications is linked to a selected set of meta-data entities of said plurality of meta-data entities and linked to a selected set of quantitative data items of said plurality of quantitative data items, said management module, further, for configuring to publication webpage for said selected publication for displaying said selected set of meta-data entities and selected set of quantitative data items linked to said selected publication, said management module further for configuring an entity webpage for a selected meta-data entity of said selected set of meta-data entities, and determining a plurality of products including at least two different products, each of said plurality of products referenced in the document body, the title, or the abstract of at least one of said plurality of publications; and,
   an aggregator for configuring said entity webpage to aggregate each publication of said plurality of publications linked to said selected meta-data entity, including said selected publication, aggregate each of the plurality of products referenced in the document body, the title or the abstract of at least one of the plurality of publications linked to said selected meta-data entity, including said selected publication, and aggregate each of said plurality of said meta-data entities, other than said selected meta data entity, that are linked to said selected meta-data entity via said selected publication and via each other publication of said plurality of publications that are linked to said selected meta-data entity, wherein said aggregated meta-data entities, aggregated publications, and aggregated products are aggregated into web pages displayable on said entity webpage.

2. The system of claim 1, wherein said system further comprises an analyzer module, said analyzer module for processing information on at least one parameter to generate data for a graphical interface for display on said entity webpage.

3. The system of claim 2, wherein a selected set of publications of said plurality of publications is linked to said selected meta-data entity and said at least one parameter comprises geographic information and, wherein, said data for a graphical interface is generated to display geographic information on said selected set of publications in relationship to said selected meta-data entity.

4. The system of claim 2, wherein a selected set of publications of said plurality of publications is linked to said selected meta-data entity and said at least one parameter comprises time information and, wherein, said data a graphical interface is generated to display time information on said selected set of publications in relationship to said selected meta-data.

5. The system of claim 1, wherein said system further comprises an analyzer module, said analyzer module for processing information on at least one parameter to generate said data for a graphical interface for display on said publication webpage.

6. The system of claim 5, wherein said at least one parameter comprises time information and, wherein, said data for a graphical interface is generated to display time information on said selected set of meta-data entities and said selected set of quantitative data items in relationship to said publication.

7. The system of claim 5, wherein said at least one parameter comprises geographic information and, wherein, said data for a graphical interface is generated to display geographic information on said selected set of meta-data entities and said selected set of quantitative data items in relationship to said publication.

8. The system of claim 1 wherein said selected meta-data entity comprises a first meta-data entity, and the system further comprises a social networking module wherein said social networking module allows a user to create an account allowing, said user to join a group of members associated with a second selected meta-data entity of said plurality of meta-data entities stored in said database, and wherein said member is allowed to edit and create database data relevant to said group and participate in group discussions and group messaging based on said database data linked to said selected meta-data entity in said database.

9. The system of claim 8, wherein said group messaging comprises a newsfeed that displays information on selected system activities to said user.

10. The system of claim 8, wherein said second meta-data entity comprises a knowledge field and wherein said group of members comprise researchers in said knowledge field.

11. The system of claim 8, wherein second meta-data entity comprises an institution field and said group of members comprise employees of said institution.

12. A system for displaying dynamic meta-knowledge, said system comprising:
   a database for storing, a record of data including a plurality of publications each including a document body, a title and an abstract, a plurality of meta-data entities and a plurality of quantitative data items;
   a management module for managing said database and configuring links, wherein a selected publication of said plurality of publications is linked to a selected set of meta-data entities of said plurality of meta-data entities and linked to a selected set of quantitative data items of said plurality of quantitative data items, said management module, further, for configuring a publication webpage for said selected publication for displaying said selected set of meta-data entities and selected set of quantitative data items linked to said selected publication, said management module further for configuring an entity webpage for a selected meta-data entity of said selected set of meta-data entities, and determining a plurality of products including at least two different products, each of the plurality of products referenced in the document body, the title or the abstract of at least one of the plurality of publications; and, an aggregator for configuring said entity webpage to aggregate each publication of said plurality of publications linked to said selected meta-data entity, including said selected publication, aggregate each of the plurality of products referenced in the document body, the title or the abstract of at least one of the plurality of publications linked to said selected meta-data entity, including said selected publication, and aggregate each of said plurality of said meta-data entities, other than said selected entity, that are linked to said selected meta-data entity via said selected publication and via each other publication of said plurality of publications that are linked to said selected meta-data entity, wherein said aggregated meta-data entities, aggregated publications, and aggregated products are aggregated into web pages displayable on said entity webpage;

said management module, further, for configuring data for a webpage for graphically displaying representations of geographical and temporal information related to the relationships between said plurality of publication, said plurality of meta-data entities, and said plurality of quantitative data item is based on said configured links.

13. The system of claim 12, wherein said data for a webpage is configured to graphically display information on said at least one publication over time based on time related meta-data of said at least one meta-data entity linked to said at least one publication.

14. The system of claim 12, wherein said data for a webpage is configured to graphically display information on said at least one publication over geographical space based on geographic related meta-data of said at least one meta-data entity linked to said at least one publication.

15. The system of claim 12, wherein said data for a webpage is configured to graphically display information relating to said at least one publication in a graphical display having a time axis and an axis representing information on said at least one quantitative data item linked to said at least one publication and said at least one meta-data entity.

16. A system for advertising utilizing dynamic meta-knowledge, said system comprising:

a database for storing a record of a plurality of publications, each of the plurality of publications including a document body title and abstract, a plurality of meta-data entities and, a plurality of quantitative data items;

a management module for creating, links between individual ones of said plurality of publications, plurality of data entities and said plurality of quantitative data items in said database, said management module, further, for configuring a first and second publication webpage for a first and second publication, respectively, of said plurality of publications, said first and second publication webpage each displaying selected meta-data entity of said plurality of meta-data entities linked to each of said first and second publication, and respectively displaying a first and a second quantitative data item of said plurality of quantitative data items linked, respectively, to said first and second publication, said management module further for configuring an entity webpage for said selected meta-data entity of said plurality of meta-data entities, and, further, for determining as first product that is referenced in the document body, the abstract or the title of said first publication and a second product that is different from said first product and referenced in the document body, the abstract or the title of said second publication, and displaying information on said first publication website associated with said first product and information on said second publication website associated with said second product, said manager module further for configuring said entity webpage to display information associated with said first product based on said first product being referenced in said first publication and based on said selected meta-data entity being linked to said first publication, and further, to display information associated with said second product, based on the second product being referenced in said second publication and based on said selected meta-data entity being linked to said second publication.

17. The system of claim 16, wherein said management module configures a first product webpage for said first product, said first product webpage aggregating and reporting said first publication and other publications of said plurality of publications that reference said first product.

18. The system of claim 16 wherein said management module, further, configures a company webpage for each company that provides said first product, wherein each said company web page aggregates said first product and said first publication, and other publications of said plurality of publications linked to said first product.

19. The system of claim 18, wherein a user may purchase said first product from each said company webpage.

20. The system of claim 18, wherein said management module, further, configures a product usage webpage for said first product for displaying geographical and temporal based representations of usage of said first product based on information from said selected meta-data entity linked to said first publication and also based on information from other meta-data entities linked to other publications of said plurality of publications that reference said first product.

* * * * *